US012462798B1

(12) United States Patent
Srivastav et al.

(10) Patent No.: US 12,462,798 B1
(45) Date of Patent: Nov. 4, 2025

(54) EVALUATION OF SPEECH PROCESSING COMPONENTS

(71) Applicant: Amazon Technologies, Inc., Seattle, WA (US)

(72) Inventors: Shubham Srivastav, Natick, MA (US); James J Logan, Southborough, MA (US); Siyong Liang, Menlo Park, CA (US); Arjun R Athreya, Fairfield, CT (US); Parag Kurlawala, Bedford, MA (US); Michael K Leung, Stoneham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 796 days.

(21) Appl. No.: 17/485,897

(22) Filed: Sep. 27, 2021

(51) Int. Cl.
*G10L 15/22* (2006.01)
*G06F 40/295* (2020.01)
*G10L 13/02* (2013.01)

(52) U.S. Cl.
CPC ............ *G10L 15/22* (2013.01); *G06F 40/295* (2020.01); *G10L 13/02* (2013.01); *G10L 2015/225* (2013.01)

(58) Field of Classification Search
CPC .............. G10L 15/22; G10L 13/02; G10L 2015/225; G06F 40/295
See application file for complete search history.

(56) References Cited

U.S. PATENT DOCUMENTS

| | | | | |
|---|---|---|---|---|
| 10,121,493 | B2* | 11/2018 | Aravamudan | G10L 25/54 |
| 11,157,696 | B1* | 10/2021 | Ramos | G10L 15/02 |
| 11,495,208 | B2* | 11/2022 | Ganong, III | G10L 15/08 |
| 11,556,713 | B2* | 1/2023 | Sapugay | G06F 40/30 |
| 11,790,898 | B1* | 10/2023 | Teng | G10L 15/19 |
| | | | | 704/257 |
| 2015/0081279 | A1* | 3/2015 | Suleman | G06F 40/237 |
| | | | | 704/9 |
| 2022/0374605 | A1* | 11/2022 | Sethi | G06T 19/006 |

* cited by examiner

*Primary Examiner* — Richemond Dorvil
*Assistant Examiner* — Zeeshan Mahmood Shaikh
(74) *Attorney, Agent, or Firm* — Pierce Atwood LLP

(57) ABSTRACT

Techniques for evaluating speech processing components are described. A system may receive a task request including at least a plurality of entity names to be evaluated by at least one speech processing component. The system may determine synthetic user inputs corresponding to the plurality of entity names, and may cause performance of a speech processing task using the synthetic user inputs. The speech processing task may be an ASR processing task, an NLU processing task, or an ER processing task. The system may compare the results of the speech processing task with ground truth data to determine if an error occurred during processing.

17 Claims, 13 Drawing Sheets

EVALUATION OF SPEECH PROCESSING COMPONENTS

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
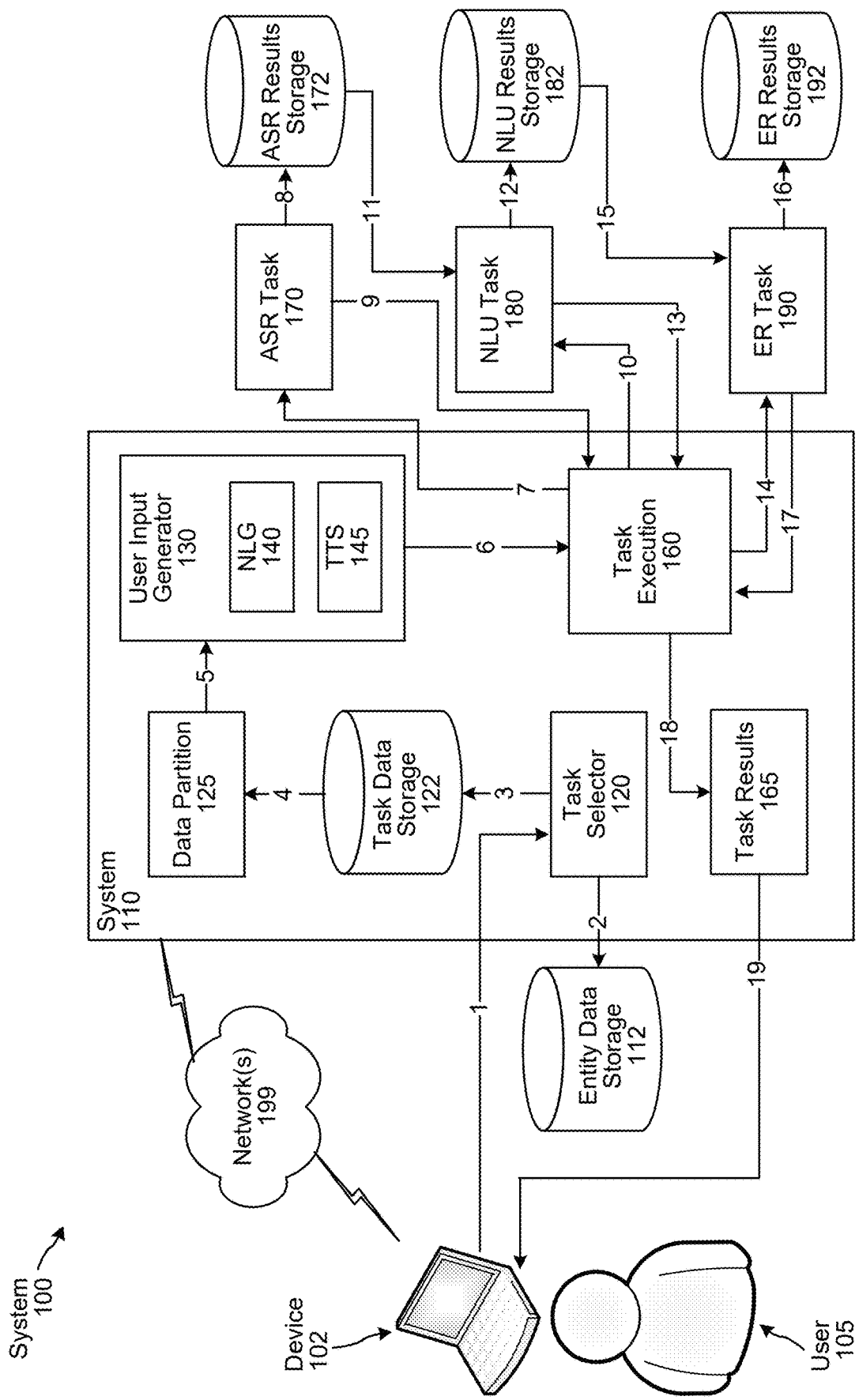
FIG. 1 is a conceptual diagram illustrating a system for evaluating processing of user inputs by speech processing components, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. NLU may involve domain classification, intent classification and named entity recognition. Named entity recognition may involve identifying an entity (e.g., a place, a person, a thing, a topic, an event, or other objects) included in a user input, and also identifying a type of entity. Entity resolution (ER) may involve determining a real-world object/entity that corresponds to the identified entity in the user input. Collectively, ASR, NLU, and ER may be referred to as a speech processing system.

Certain speech processing systems may be configured to perform actions responsive to user inputs. For example, for the user input of "Alexa, play music by [artist]," a system may output music sung by the indicated artist. For further example, for the user input of "Alexa, what is the weather for [city]," a system may output synthesized speech representing weather information for a geographic location of the user. In a further example, for the user input of "Alexa, send a message to John," a system may capture spoken message content and cause same to be output via a device registered to "John."

In some cases, processing by the speech processing system may result in an undesired response or an error. For example, the speech processing system may misrecognize a word said by a user (which may be a result of an error in ASR processing). As another example, the speech processing system may misinterpret a user's intent (which may be a result of an error in NLU processing). As another example, the speech processing system may misidentify an entity (e.g., play the wrong song) indicated by a user (which may be a result of an error in ER processing).

The present disclosure relates to techniques for evaluating processing performed by speech processing system components, where such evaluation may be used to determine which speech processing component is causing an error. The evaluation described herein may be performed during offline operations, for example, using instances of speech processing components that may be in production (used for processing incoming user inputs).

The techniques presented herein involve machine generation of inputs (also referred to herein as "synthetic user inputs"), using at least a plurality of entities, for evaluating the speech processing system. In some embodiments, if desired by a user, the entire speech processing pipeline, involving an ASR processing task, a NLU processing task and an ER processing task, may be evaluated. In such cases, the downstream processing task may process results from the previous processing task, along with synthetic inputs. For example, the NLU processing task may process ASR results data generated by the ASR processing task, and may also process text data generated by the machine to represent synthetic user inputs. Such processing of synthetic user inputs may avoid propagating any errors present in the ASR processing task to downstream processing tasks. Techniques herein also enable evaluation of portions of the speech processing system. For example, a NLU processing task may be evaluated, using synthetic user inputs, without performing an ASR processing task.

In some embodiments, the techniques described herein may be implemented in a serverless computing manner. Serverless computing may involve a method of providing backend services on an as-used basis. A serverless computing system may allow users to write and deploy code without maintaining or managing the underlying infrastructure. A user that uses backend services from a serverless computing system may be charged a fee based on the computation performed, rather than paying for a fixed amount of bandwidth or number of servers, as the serverless computing functionality can be auto-scaling. Despite the name "serverless," a serverless computing system still uses physical servers but users of the system do not need to be aware of them. With serverless computing, infrastructure management tasks like capacity provisioning and patching are handled by the serverless computing provider, so a user can focus on writing code that serves the user's goal.

Based on the results of the speech processing components processing user inputs corresponding to a plurality of entity names, one or more in-production speech processing components (e.g., components that receive human user inputs or otherwise used to process non-synthetic user inputs) may be updated, so that errors in processing user inputs may be reduced.

The teachings of the present disclosure may provide a more desirable user experience. This is due, at least in part, to the fact that the present disclosure's teachings decrease a frequency at which undesired actions are performed by a system. By decreasing the instances of such actions being performed, user/system interactions may be improved. The teachings of the present disclosure may also be used by system engineers to identify and improve system components that are causing the undesired actions.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

FIG. 1 shows a system 100 configured to evaluate processing of user inputs by speech processing components. As shown in FIG. 1, the system 100 may include a device 102, local to a user 105, and a system 110 connected across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 110 may be configured to process task requests received from the user 105 via the device 102, where the task requests may relate to processing user inputs using one or more speech processing components and evaluate the processing with respect to ground truth data. In some embodiments, the speech processing components may correspond to an ASR component, an NLU component and an ER component. In other embodiments, additional speech processing components may be included.

The user 105 may provide one or more inputs, at the device 102, corresponding to the task request. The inputs may indicate a domain and an intent corresponding to the task. The inputs may also indicate a plurality of entities corresponding to the task. In some embodiments, the user 105 may upload one or more files including the plurality of entities. In other embodiments, the user 105 may indicate a data storage (e.g., an entity data storage 112) from which the system 110 may retrieve entities. Data corresponding to an entity may include an entity identifier (ID), an entity type, and an entity name. The entity ID may uniquely identify the entity name within an entity source. In some embodiments, the user 105 may also identify the entity source that the speech processing system is to interface with. The user 105 may provide the foregoing inputs via a user interface presented at the device 102. The user interface may include input fields and other interface elements (e.g., text fields, file upload button, etc.) to enable the user 105 to provide the inputs.

In a non-limiting example, the user 105 may want to evaluate entities for a music domain. The user 105 may provide an input indicating the domain as "Music Domain" and the intent as "PlaySongIntent." The user 105 may provide the following example entities (via a file upload or by providing a location of or access to the entity data storage 112): (1) entity ID=ABC12; entity type=Artist; entity name=[first artist name]; (2) entity ID=XYZ34; entity type=Song; entity name=[song name]; (3) entity ID=ABC56; entity type=Artist; entity name=[second artist name], etc.

In some embodiments, the user 105 may also indicate the type of task to be executed. For example, the user 105 may want to evaluate ASR processing with respect to user inputs corresponding to the indicated domain, intent and entities. As another example, the user 105 may want to evaluate NLU processing with respect to user inputs corresponding to the indicated domain, intent and entities. In yet another example, the user 105 may want to evaluate ER processing with respect to the user inputs corresponding to the indicated domain, intent and entities. In some instances, the user 105 may want to evaluate more than one of ASR processing, NLU processing, and ER processing.

In some embodiments, the user 105 may also provide one or more user input templates, with a user input template indicating a manner in which a speech processing system may receive user inputs relating to the particular domain, intent and/or entities. For the music domain example above, the user input templates may be "Alexa, play <song name>", "Alexa, turn on music by <artist>", "Alexa, what's new by <artist>", etc.

The foregoing inputs, provided by the user 105, may be referred to as task request data herein. The device 102 may send (at step 1) the task request data to the system 110. In some embodiments, the system 110 may initiate processing of the task request upon receipt of the task request data. In other embodiments, the system 110 may initiate pre-processing steps for the task request (e.g., preparation of data, etc.), and may initiate the task when the user 105 provides an input to start the task (e.g., the user 105 may indicate a time when the task is to be started, the user 105 may click on a button in the user interface at the device 102 to start the task, etc.). Steps 2-5 may relate to pre-processing steps for the task request.

The task request data may be received by a task selector component 120. In the case that the user 105 indicated that entities are to be retrieved from the entity data storage 112, the task selector component 120 may send (step 2) a request to retrieve entity data from the entity data storage 112. The task selector component 120 may store (step 3) the task request data, at a task data storage 122, along with a task ID to track data relating to the particular task. In some embodiments, the task ID may be provided to the user 105, via the user interface at the device 102 or via a notification (e.g., an email, a SMS message, a push notification via a companion application, etc.). The user 105 may use the task ID to later retrieve the results of the task execution. The task request data stored at the task data storage 122 may include the domain, the intent, and the entity data provided by the user 105.

The task selector component 120 component may be an API component, part of the serverless computing system, which may enable creation, publishing, maintaining and monitoring of REST and Websocket APIs at any scale. An example API component may be provided by Amazon API Gateway. Using API Gateway, a user can create RESTful APIs and WebSocket APIs that enable real-time two-way communication applications. API Gateway supports containerized and serverless workloads, as well as web applications. API Gateway can handle all the tasks involved in accepting and processing multiple concurrent API calls, including traffic management, support, authorization and access control, throttling, monitoring, and API version management.

The task data storage 122 may be a database service, part of the serverless computing system, that may be a no-SQL database service configured to provide a key-value and document database. An example database service may be provided by Amazon DynamoDB. Amazon DynamoDB may deliver single-digit millisecond performance at any scale, and may be a fully managed, multi-region, multi-active, durable database with built-in security, backup and restore, and in-memory caching for internet-scale applications.

A data partition component 125 may receive (at step 4) the task request data from the task data storage 122. The data partition component 125 may be configured to partition the entity data into smaller portions, and cause parallel execution for each of the smaller portions. In a non-limiting example, the task request data may include 10,000 entities, and the data partition component 125 may determine four portions of the entities each including 2,500 entities. The size of the smaller portions may be configurable by the user 105 or an administrator of the system 110. The data partition component 125 may determine the size of the smaller portions based on various factors, such as, availability of resources/components shown in FIG. 1, number of tasks in a queue, resource constraints, time constraints, etc. The size of the smaller portions may correspond to a size of data that results in efficient processing by the system 110 or the task components (e.g., 170, 180, and/or 190).

In some embodiments, the data partition component 125 may be may be a serverless container, part of the serverless computing system, and configured as a pay-as-you-go compute engine. A user may define compute resources needed, and the serverless container may scale computing resources accordingly without a user needing to over-provision to handle additional/unexpected computing. An example serverless container may be provided by Amazon Web Services (AWS) Fargate.

In some embodiments, the data partition component 125 may store the partitioned data using an object storage service, part of the serverless computing system, that may enable storing of any amount of data with scalability, data security and performance. An example object storage service may be provided by Amazon Similar Storage Service (Amazon S3). Using Amazon S3 users may store and protect any amount of data for a range of use cases, such as data lakes, websites, mobile applications, backup and restore, archive, enterprise applications, IoT devices, and big data analytics. Amazon S3 provides easy-to-use management features so a user can organize data and configure finely-tuned access controls to meet specific requirements.

The data partition component 125 may send (step 5) the partitioned data to a user input generator component 130, which may be configured to generate a plurality of user inputs including the entities. The data generated by the user input generator component 130 may be referred to as synthetic user inputs. The user input generator component 130 may perform batch processing based on the partitioned data, and may output data/files corresponding to the partitioned data. In some embodiments, the user input generator component 130 may use the user input templates, if provided, to generate the user inputs. For example, the user input generator component 130 may insert a first entity from the entity data into a first user input template to determine a first user input, may then insert the first entity into a second user input template to determine a second user input, may then insert a second entity from the entity data into the first user input template to determine a third user input, and so on.

In other embodiments, the user input generator component 130 may use a natural language generator (NLG) component 140 to determine a plurality of user inputs including the entities. The NLG component 140 may employ natural language generation techniques and semantic analysis techniques to determine the plurality of user inputs. The NLG component 140 may determine a first word(s) (e.g., a verb, a noun, etc.) corresponding the intent included in the task request data, and form a user input using the first word(s) and a first entity from the entity data. The NLG component 140 may use semantic analysis techniques to determine a second word(s) that is semantically similar to the first word(s), and form another user input using the second word(s) and the first entity. For example, the first user input may be "play music by [first artist]", and the second user input may be "play a song by [first artist]." The plurality of user inputs may be different ways that a user may use the entity in an input to the speech processing system. The data outputted by the NLG component 140 may be text data representing the user inputs. Although text data is described as being representative of the plurality of user inputs, other type of data (e.g., token data, word embedding data, or other data representing natural language inputs) may be used to represent the plurality of user inputs. In some embodiments, the NLG component 140 may use a grammar model to determine the plurality of user inputs. For example, the NLG component 140 may use a grammar model(s) 876 described below in relation to FIG. 8, where the grammar model may represent how sentences are formed in natural language.

In some embodiments, the user input generator component 130 may output text data corresponding to the plurality of user inputs. Alternatively or additionally, the user input generator component 130 may output other meaning representation data (e.g., first-order logic meaning representation, meaning representation using a directed graph, slot-filter knowledge representation, semantic role labeling, etc.) corresponding to the plurality user inputs.

Using a TTS component 145, the user input generator component 130 may generate audio data representing synthesized speech corresponding to a plurality of user inputs. The TTS component 145 may use the plurality of user inputs (e.g., text data, other meaning representation data, etc.) determined by the NLG component 140 to determine the audio data. The TTS component 145 may process the text data representing the plurality of user inputs to insert synthesized speech markup language (SSML) tags, that may be used to generate the synthesized speech. The TTS component 145 may use various voice profiles to generate the synthesized speech, so that the audio data outputted by the TTS component 145 may correspond to various voice characteristics. A voice profile may correspond to a male or female voice, a particular accent, a particular pitch, a particular speech speed, and other voice characteristics. Further details on the TTS component 145 are described below in relation to FIG. 6.

In some embodiments, the user input generator component 130 may determine audio data representing spoken inputs (by a person(s)) corresponding to the plurality of user inputs determined using the task request data. For example, the user input generator component 130 may store (in a data storage associated with the user input generator component 130) various audio data corresponding to different individual spoken inputs, where each audio data may be associated with one or more tags. The tags may indicate an intent, a domain, an entity name, and/or an entity type. Based on the entity names and/or entity types included in the task request data, the user input generator component 130 may select one or more of the audio data (as synthetic user inputs) to be used for the task request.

In some embodiments, the user input generator component 130 may be a serverless container, part of the serverless computing system. For example, the user input generate component 130 may be provided by AWS Fargate described herein.

After the plurality of user inputs (text user inputs and synthesized speech user inputs) are generated by the user input generator component 130, a task execution component 160 may receive (at step 6) the plurality of user inputs. The task execution component 160 may also receive the task ID to track results of processing the task request. The task execution component 160 may be configured to initiate various tasks for evaluating the plurality of user inputs. The task execution component 160 may process with respect to the partitioned data. For example, the task execution component 160 may receive multiple data/files from the user input generator component 130, and the task execution component 160 may initiate a respective task for each received data/file in parallel.

The example steps shown in FIG. 1 illustrate the case where the plurality of user inputs are to be evaluated using ASR processing, NLU processing and ER processing. The task execution component 160 may send (at step 7), to an ASR task component 170, the audio data, received from the user input generator component 130, representing synthesized speech corresponding to the plurality of user inputs. The task execution component 160 may also send the task ID to the ASR task component 170.

The ASR task component 170 may be configured to process audio data, including speech, to determine corresponding ASR data. The ASR data may include one or more ASR hypotheses, each including text data or token data and a confidence score. The text data or the token data may correspond to the words represented in the audio data. The ASR task component 170 may determine ASR data corresponding to each user input represented in the audio data. The ASR task component 170 may store (step 8) the ASR data, for each user input, in an ASR results storage 172. In the ASR results storage 172, the ASR data may be associated with the audio data from which it was generated, and the task ID. The ASR results storage 172 may be an object storage service. For example, the ASR results storage 172 may be provided by Amazon S3 described herein. Further details on the ASR task component 170 are described below in relation with FIG. 7.

In some embodiments, the ASR task component 170 may be an ASR component 950/1050 used to process user inputs during runtime/live processing. In some embodiments, the ASR task component 170 may be an ASR component that is different from the ASR component 950/1050, and may be an updated version of the ASR component 950/1050 that a user wants to evaluate before transferring to the runtime/live system. In some embodiments, the task execution component 160 may store data indicating how the ASR task component 170 may be accessed (e.g., file/data location, a link to a system including the ASR task component 170, an API definition to invoke the ASR task component 170, etc.). In some embodiments, the task request data (received in step 1) may include data indicating how the ASR task component 170 may be accessed. For example, the task request data may include a link to access the ASR task component 170, or may include a location (e.g., file location path, database, server, etc.) where the ASR task component 170 is stored.

After the ASR task component 170 has completed processing each of the plurality of user inputs represented in the audio data, the ASR task component 170 may send (step 9) a notification to the task execution component 160 indicating that the ASR processing task associated with the task ID is completed.

The ASR task component 170 may send the notification to a notification component, part of the serverless computing system, which may be a fully managed messaging service for both application-to-application (A2A) and application-to-person (A2P) communication. The A2A functionality of the notification component may provide topics for high-throughput, push-based, many-to-many messaging between distributed systems, microservices, and event-driven serverless applications. The A2P functionality of the notification component may enable sending messages to users at scale via SMS, mobile push, and email. An example notification component may be provided by Amazon Simple Notification Service (SNS). Using Amazon SNS topics, the publisher systems can fanout messages to a large number of subscriber systems including Amazon SQS queues, AWS Lambda functions and HTTPS endpoints, for parallel processing.

In some embodiments, the notification from the notification component may be received by a queue management component that may be configured to decouple and scale microservices with message queues that send, store and receive messages at any volume. The queue management component may be a fully managed message queuing service that enables a user to decouple and scale microservices, distributed systems, and serverless applications. An example queue management component may be provided by Amazon Simple Queue Service (SQS). The SQS may eliminate the complexity and overhead associated with managing and operating message-oriented middleware, and may empower developers to focus on differentiating work. Using SQS, a user can send, store, and receive messages between software components at any volume, without losing messages or requiring other services to be available. The queue management component may employ a standard queue that may use best-effort ordering and at-least-once delivery techniques. In other embodiment, the queue management component may employ a FIFO queue configured to process a message exactly once and in the exact order they are received.

Alternatively or additionally, the notification from the notification component may be received by a serverless compute engine, part of the serverless computing system. The serverless compute engine may enable a user to run software code without provisioning or managing servers, may enable creation of workload-aware cluster scaling logic, maintain event integrations, or manage runtimes. A user may run software code for virtually any type of application or backend service, without any administration. The user can upload the software code as a ZIP file or a container image, and the serverless compute engine may automatically and precisely allocate compute execution power and run the software code based on the incoming request or event, for any scale of traffic. The software code can be set up to automatically trigger from other services and SaaS applications or can be called directly from any web or mobile app. The software code may be written in various programming languages, such as, Node.js, Python, Go, Java, etc. An example serverless compute engine may be provided by AWS Lambda.

Upon receiving the notification from the ASR task component 170, the task execution component 160 may initiate a NLU processing task. The task execution component 160 may send (step 10) a command to an NLU task component 180 along with the task ID. The task execution component 160 may also send the text data representing the plurality of user inputs and generated by the user input generator component 130 to the NLU task component 180. In response to receiving the command from the task execution component 160, the NLU task component 180 may retrieve (at step 11) the ASR data, associated with the task ID, from the ASR results storage 172. The NLU task component 180 may be configured to process the text data from the user input generator component 130 and the ASR data from the ASR task component 170. In processing the text data from the user input generator 130, the NLU task component 180 may avoid propagation of any ASR processing errors (e.g., misunderstanding of a word, etc.), by the ASR task component 170, into the NLU task processing. As such, the NLU task component 180 may perform two task pipelines-one based on the ASR data from the ASR results storage 172, and another based on synthetic user inputs from the user input generator 130—for evaluating the NLU processing task.

The NLU task component 180 may be configured to perform NLU processing, which may involve domain classification, intent classification, and named entity recognition. The NLU task component 180 may determine NLU data corresponding to each user input represented in the text data from the user input generator component 130 and each user input represented in the ASR data from the ASR task component 170. The NLU data for each user input may include one or more NLU hypotheses, and each NLU hypothesis may include a domain, an intent, entity data, and a confidence score. The entity data included in the NLU hypothesis may include an entity name and an entity type corresponding to the entity name.

The NLU task component 180 may store (step 12) the NLU data corresponding to the user inputs in a NLU results storage 182. The NLU results storage 182 may associate the NLU data with the task ID, and may further associate each NLU data with the corresponding text data (from the user input generator component 130) or ASR data (from the ASR task component 170). The NLU results storage 182 may be an object storage service, part of the serverless computing system. In some embodiments, the NLU results storage 182 may be provided by Amazon S3 described herein. Further details on the NLU task component 180 are described below in relation to FIG. 8.

In some embodiments, the NLU task component 180 may be an NLU component 960/1060 used to process user inputs during runtime/live processing. In some embodiments, the NLU task component 180 may be an NLU component that is different from the NLU component 960/1060, and may be an updated version of the NLU component 960/1060 that a user wants to evaluate before transferring to the runtime/live system. In some embodiments, the task execution component 160 may store data indicating how the NLU task component 180 may be accessed (e.g., file/data location, a link to a system including the NLU task component 180, an API definition to invoke the NLU task component 180, etc.). In some embodiments, the task request data (received in step 1) may include data indicating how the NLU task component 180 may be accessed. For example, the task request data may include a link to access the NLU task component 180, or may include a location (e.g., file location path, database, server, etc.) where the NLU task component 180 is stored.

After the NLU task component 180 has completed processing with respect to each of the plurality of user inputs, the NLU task component 180 may send (step 13) a notification to the task execution component 160 indicating that the NLU processing task associated with the task ID is completed.

In some embodiments, the NLU task component 180 may send the notification to a notification component, part of the serverless computing system, configured which may be a fully managed messaging service for both application-to-application (A2A) and application-to-person (A2P) communication. In some example embodiments, the notification component may be provided by Amazon SNS described herein.

In some embodiments, the notification from the notification component may be received by a queue management component, part of the serverless computing system, that may be configured to decouple and scale microservices with message queues that send, store and receive messages at any volume. In some embodiments, the queue management component may be provided by Amazon SQS described herein.

Alternatively or additionally, the notification from the notification component may be received by a serverless compute engine, part of the serverless computing system. In some embodiments, the serverless compute engine may be provided by AWS Lambda.

Upon receiving the notification from the NLU task component 180, the task execution component 160 may initiate an ER processing task. The task execution component 160 may send (step 14) a command to an ER task component 190 along with the task ID.

In some embodiments, the task execution component 160 may also send a portion of the entity data (which may be referred to as synthetic entity data) included in the task data storage 122. One of the components of the system 110 or another component may determine the synthetic entity data to include the entity name and the entity type corresponding to each entity stored in the task data storage 122 and associated with the task ID. The synthetic entity data may also include an intent and/or a domain corresponding to each entity name.

In response to receiving the command from the task execution component 160, the ER task component 190 may retrieve (at step 15) the NLU data, associated with the task ID, from the NLU results storage 182. The ER task component 190 may be configured to process the synthetic entity data and the NLU data from the NLU task component 180. In processing the synthetic entity data, the ER task component 190 may avoid propagation of any NLU processing errors (e.g., misinterpretation of a user input, etc.), by the NLU task component 180, into the ER task processing. As such, the ER task component 190 may perform two task pipelines-one based on the NLU data from the NLU results storage 182, and another based on synthetic user inputs from the user input generator 130—for evaluating the ER processing task.

The ER task component 190 may be configured to perform entity resolution, which may involve determining an entity ID, from an entity source, corresponding to the entity name and the entity type. The ER task component 190 may use the intent and/or domain, corresponding to the entity name, to select one or more entity sources to perform entity resolution. For example, if the entity name corresponds to a music domain, the ER task component 190 may select one or more music entity sources to perform entity resolution. As another example, if the entity name corresponds to a "play" intent, the ER task component 190 may select entity sources corresponding to music, media (e.g., movies, TV shows, podcasts, etc.), and/or books. The ER task component 190 may use other data in selecting the entity source, such as, the entity type (e.g., song name, movie name, artist name, actor name, etc.). The ER task component 190 may determine the entity ID corresponding to each entity represented in the NLU data from the NLU task component 180 and each entity represented in the synthetic entity data. In some embodiments, the ER task component 190 may determine a ranked list of entity IDs for each entity name. The ER task component 190 may store (step 16) ER results data including the determined entity ID (or ranked list of entity IDs), corresponding entity name, corresponding entity type, and corresponding entity source in an ER results storage 192. The foregoing data may be associated with the task ID in the ER results storage 192. In the case the entity ID (or ranked list of entity IDs) corresponds to an entity name from the NLU data, the ER results storage 192 may also store the NLU data along with the entity ID (or ranked list of entity IDs).

The ER results storage 192 may be an object storage service, part of the serverless computing system. In some embodiments, the ER results storage 192 may be provided by Amazon S3.

In some embodiments, the ER task component 190 may be an ER component 965/1065 used to process user inputs during runtime/live processing. In some embodiments, the ER task component 190 may be an ER component that is different from the ER component 965/1065, and may be an updated version of the ER component 965/1065 that a user wants to evaluate before transferring to the runtime/live system. In some embodiments, the task execution component 160 may store data indicating how the ER task component 190 may be accessed (e.g., file/data location, a link to a system including the ER task component 190, an API definition to invoke the ER task component 190, etc.). In some embodiments, the task request data (received in step 1) may include data indicating how the ER task component 190 may be accessed. For example, the task request data may include a link to access the ER task component 190, or may include a location (e.g., file location path, database, server, etc.) where the ER task component 190 is stored.

After the ER task component 190 has completed processing with respect to each of the entities, the ER task component 190 may send (step 17) a notification to the task execution component 160 indicating that the ER processing task associated with the task ID is completed.

In some embodiments, the ER task component 190 may send the notification to a notification component, part of the serverless computing system, configured which may be a fully managed messaging service for both application-to-application (A2A) and application-to-person (A2P) communication. In some example embodiments, the notification component may be provided by Amazon SNS described herein.

In some embodiments, the notification from the notification component may be received by a queue management component, part of the serverless computing system, that may be configured to decouple and scale microservices with message queues that send, store and receive messages at any volume. In some embodiments, the queue management component may be provided by Amazon SQS described herein.

Alternatively or additionally, the notification from the notification component may be received by a serverless compute engine, part of the serverless computing system. In some embodiments, the serverless compute engine may be provided by AWS Lambda.

Once the task execution component 160 receives the notification from the ER task component 190, the task execution component 160 may send (step 18) a command to a task results component 165 to aggregate and process results associated with the task ID. The task results component 165 may retrieve the ASR data, associated with the task ID, from the ASR results storage 172, may retrieve the NLU data, associated with the task ID, from the NLU results storage 182, and may also retrieve the entity results data, associated with the task ID, from the ER results storage 192. The task results component 165 may process the foregoing results data in view of the task request data, associated with the task ID, stored in the task data storage 122. As described above, the task request data may include a domain, an intent, and entity data including a plurality of entities, corresponding entity type and entity ID. The task results component 165 may use the task request data or a portion thereof as ground truth data to determine whether the results data include errors. In some embodiments, the task results component 165 may also use the text data representing the plurality of user inputs and determined by the user input generator component 130 as ground truth data.

The task results component 165 may compare the text data representing the plurality of user inputs (from the user input generator component 130) with the ASR data from the ASR results storage 172. If the ASR data corresponding to a particular user input is different than the text data representing the particular user input (e.g., has different word(s)), then the task results component 165 may flag that ASR data. By flagging, the task results component 165 may associate an error indicator with the ASR data. The error indicator may be data representing that ASR processing resulted in improper/erroneous ASR hypothesis(es).

The task results component 165 may compare the task request data (domain, intent, entity data) with the NLU data from the NLU results storage 182. If NLU data corresponding to a particular user input includes a different domain, a different intent, a different entity name and/or a different entity type from the ground truth data, then the task results component 165 may flag that NLU data. By flagging, the task results component 165 may associate an error indicator with the NLU data. The error indicator may be data representing that NLU processing resulted in improper/erroneous NLU hypothesis(es).

The task results component 165 may compare the task request data (entity data, and entity source) with the ER results data from the ER results storage 192. If the entity source selected by the ER task component 190 is different than the ground truth entity source in the task request data, then the task results component 165 may flag that as an error. If the entity ID corresponding to a particular entity name and entity type is different than the entity ID included in the task request data, then the task results component 165 may flag that entity ID. If the ground truth entity ID is not the top scoring entity ID in the ranked list determined by the ER task component 190, but is included in the ranked list, then the task results component 165 may flag that as an error. By flagging, the task results component 165 may associate an error indicator with the entity ID. The error indicator may be data representing that ER processing resulted in improper/erroneous entity ID(s).

The task results component 165 may aggregate the portion of results data associated with an error indicator. The task results component 165 may send (step 19) the aggregated results data to the device 102. Once the aggregated results data is available, the system 110 may send a notification (e.g., an email, a SMS message, a push notification via an application, a desktop notification, etc.) to the device 102 to inform the user 105 that the requested task (in step 1) is completed. The user 105 may view the aggregated results data via a user interface.

In some embodiments, the task results component 165 may process the aggregated results data to determine processing with respect to which entities resulted in an error. The task results component 165 may then determine which speech processing task resulted in the error. For example, if the entity ID determined based on the synthetic entity data by the ER task component 190 is flagged as an error, then the task results component 165 may determine that the ER processing task is the cause of the error. The task results component 165 may send, to the device 102, an indication of which speech processing task caused the error.

Although FIG. 1 shows a separate ASR task component and a NLU task component, techniques similar to the ones described herein may be used to evaluate a spoken language understanding (SLU) component. A SLU component may be configured to process audio data, representing a natural language input, and determine an intent and entity data corresponding to the natural language input. The SLU component may not perform the intermediary step of generating ASR data (e.g., text data or token data) representing the spoken natural language input, but may instead determine NLU data, corresponding to the natural language input, by processing the audio data.

In some example systems, ER processing may be part of NLU processing. In some embodiments, the ER task component 190 may be part of the NLU task component 180.

In some embodiments, the user 105 may want to evaluate processing results for a particular speech processing task, like ASR processing task, NLU processing task or ER processing task. The user 105 may provide an input indicating which processing task is to be performed with respect to the domain, the intent and the entities.

Figure 2:
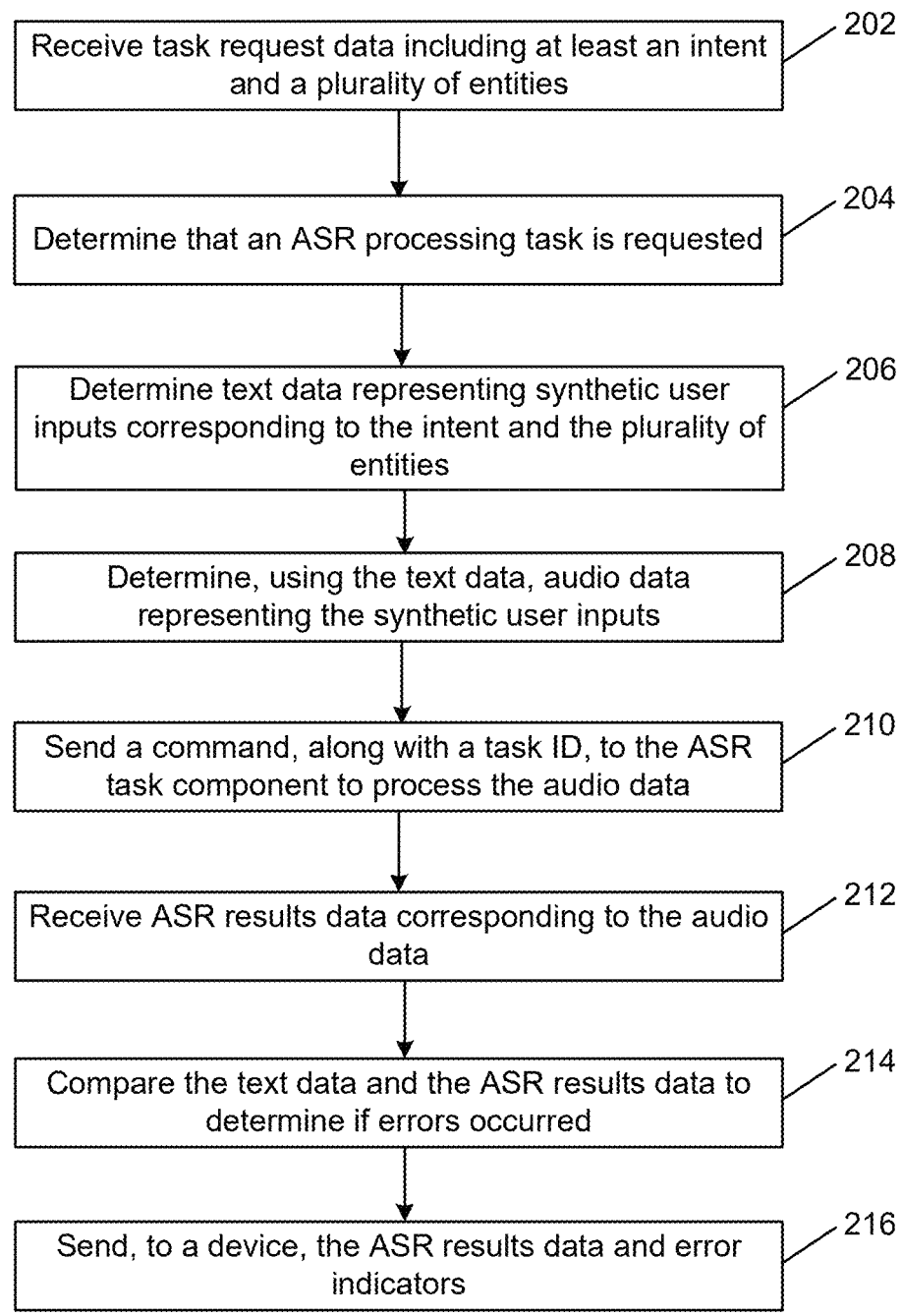
FIG. 2 is a flowchart of an example process that may be performed by a system for executing an automatic speech recognition (ASR) processing task, according to embodiments of the present disclosure.

In some cases, the user 105 may want to evaluate ASR processing results for a plurality of entities. FIG. 2 is a flowchart of an example process that may be performed by the system 110 when an ASR processing task is to be performed. The task selector component 120 may receive (202) task request data including at least an intent and a plurality of entities. The task request data may be provided by the user 105 and received from the device 102. The task request data may optionally include a domain, an entity source and entity IDs for the entities, which may not be required for the ASR processing task. The task request data may further include an indication that an ASR processing task is to be performed. For example, the user 105 may provide an input (e.g., via a drop down menu, a radio button, a checkbox, a text field, etc.) selecting the ASR processing task. The task selector component may determine (204) that the ASR processing task is requested. In response to this determination, the user input generator component 130 may determine (206) text data or other meaning representation of synthetic user inputs corresponding to the intent and the plurality of entities. The user input generator component 130 may receive a command from the task selector component 120 to perform this step. The user input generator component 130 may determine the text data in a similar manner as described above in relation to FIG. 1 (e.g., using the NLG component 140). The user input generator component 130 may determine (208), using the text data, audio data representing the synthetic user inputs. The user input generator input component 130 may determine the audio data in a similar manner as described above in relation to FIG. 1 (e.g., using the TTS component 145).

The task execution component 160 may send (210) a command, along with a task ID, to the ASR task component 170 to process the audio data. The task ID may be determined by the task selector component 120 to track results for the instant task request. In response to receiving the command, the ASR task component 170 may retrieve the audio data, using the task ID, from a data storage, may perform ASR processing using the audio data, and may determine ASR results data including ASR data for each synthetic user input represented in the audio data. The task execution component 160 may receive (212) the ASR results data corresponding to the audio data. The task execution component 160 may receive the ASR results data from the ASR task component 170 or may retrieve the ASR results data from the ASR results storage 172. In some embodiments, the task execution component 160 may receive a notification from the ASR task component 170 that the task associated with the task ID is completed, in response to which, the task execution component 160 may retrieve the ASR results data from the ASR results storage 172 (or request the ASR results data from the ASR task component 170).

The task results component 165 may compare (step 214) the text data (determined in step 206) and the ASR results data to determine if errors occurred. As described above in relation to FIG. 1, the task results component 165 may associate an error indicator with ASR data corresponding to synthetic user inputs that do not match the text data (ground truth data). The task results component 165 may send (216), to a device (e.g., the device 102), the ASR results data and the error indicators. The foregoing data may be sent when the user 105 requests to view the results of the task corresponding to the task data request (received in step 202).

In some embodiments, the system 110 may only use an intent and a plurality of entity names to perform the ASR processing task, and may not use a domain, an entity type, or an entity source.

Figure 3:
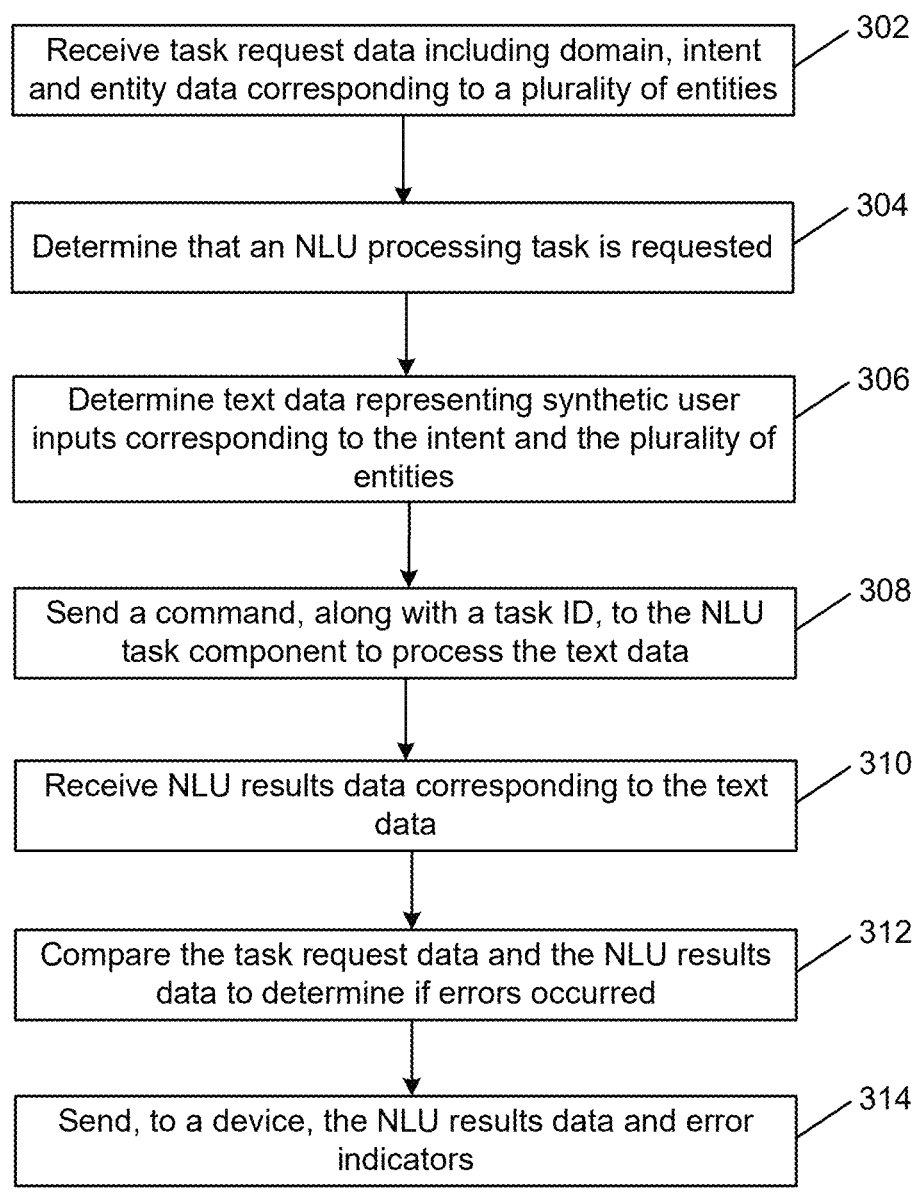
FIG. 3 is a flowchart of an example process that may be performed by a system for executing a natural language understanding (NLU) processing task, according to embodiments of the present disclosure.

In some cases, the user 105 may want to evaluate NLU processing results for a plurality of entities. FIG. 3 is a flowchart of an example process that may be performed by the system 110 when an NLU processing task is to be performed. The task selector component 120 may receive (302) task request data including a domain, an intent, and entity data (entity name and entity type) corresponding to a plurality of entities. The task request data may optionally include an entity source and entity IDs for each of the entities. The task request data may be provided by the user 105 and received from the device 102. The task request data may further include an indication that an NLU processing task is to be performed. For example, the user 105 may provide an input (e.g., via a drop down menu, a radio button, a checkbox, a text field, etc.) selecting the NLU processing task. The task selector component may determine (304) that the NLU processing task is requested. In response to this determination, the user input generator component 130 may determine (306) text data (or other meaning representation) representing synthetic user inputs corresponding to the intent and the plurality of entities. The user input generator component 130 may receive a command from the task selector component 120 to perform this step. The user input generator component 130 may determine the text data in a similar manner as described above in relation to FIG. 1 (e.g., using the NLG component 140).

The task execution component 160 may send (308) a command, along with a task ID, to the NLU task component 180 to process the text data. The task ID may be determined by the task selector component 120 to track results for the instant task request. In response to receiving the command, the NLU task component 180 may retrieve the text data, using the task ID, from a data storage, may perform NLU processing using the text data, and may determine NLU results data including NLU data (one or more NLU hypotheses including a domain, an intent, an entity name, and an entity type) for each synthetic user input represented in the text data. The task execution component 160 may receive (310) the NLU results data corresponding to the text data. The task execution component 160 may receive the NLU results data from the NLU task component 180 or may retrieve the NLU results data from the NLU results storage 182. In some embodiments, the task execution component 160 may receive a notification from the NLU task component 180 that the task associated with the task ID is completed, in response to which, the task execution component 160 may retrieve the NLU results data from the NLU results storage 182 (or request the NLU results data from the NLU task component 180).

The task results component 165 may compare (step 312) the task request data (received in step 302; including the domain, the intent, entity names and corresponding entity types) and the NLU results data to determine if errors occurred. As described above in relation to FIG. 1, the task results component 165 may associate an error indicator with NLU data corresponding to synthetic user inputs that do not match the task request data (ground truth data). The task results component 165 may send (314), to a device (e.g., the device 102), the NLU results data and the error indicators. The foregoing data may be sent when the user 105 requests to view the results of the task corresponding to the task data request (received in step 302).

Figure 4:
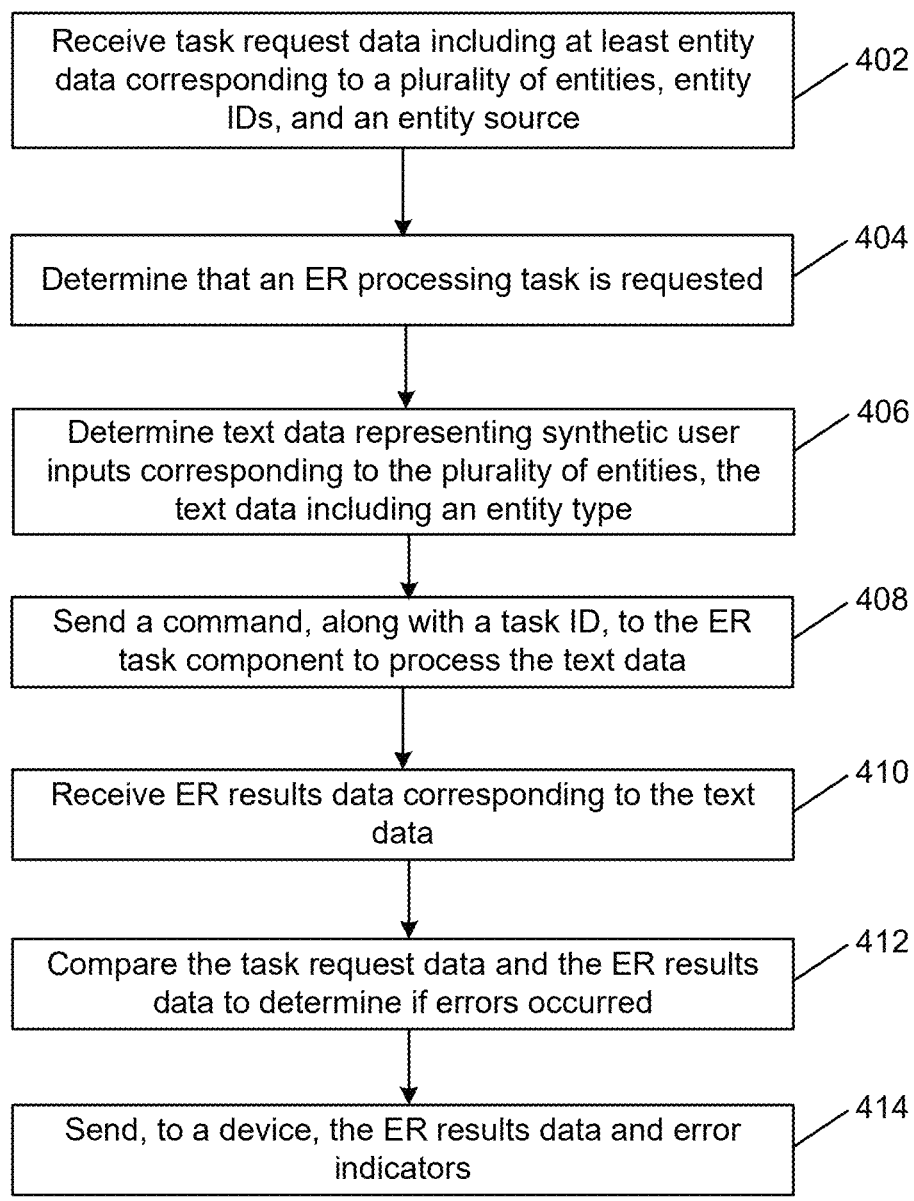
FIG. 4 is a flowchart of an example process that may be performed by a system for executing an entity resolution (ER) processing task, according to embodiments of the present disclosure.

In some cases, the user 105 may want to evaluate ER processing results for a plurality of entities. FIG. 4 is a flowchart of an example process that may be performed by the system 110 when an ER processing task is to be performed. The task selector component 120 may receive (402) task request data including at least entity data (entity name and entity type) corresponding to a plurality of entities, entity IDs and an entity source. The task request data may also include a domain and an intent. The task request data may be provided by the user 105 and received from the device 102. The task request data may further include an indication that an ER processing task is to be performed. For example, the user 105 may provide an input (e.g., via a drop down menu, a radio button, a checkbox, a text field, etc.) selecting the ER processing task. The task selector component may determine (404) that the ER processing task is requested. In response to this determination, the user input generator component 130 may determine (406) text data (or other meaning representation) representing synthetic user inputs corresponding to the plurality of entities, where the text data may include an entity type. In this case, the user input generator component 130 may select different intents to include in the synthetic user inputs. The user input generator component 130 may also associate an entity type with the entity name included in the synthetic user input, where the entity type may be based on the task request data. For example, a synthetic user input, in this case may be, "Play {song name} [song name]", where {song name} is metadata indicating the entity type and [song name] corresponds to the entity name. The synthetic user input may further be associated with an intent and/or a domain. The user input generator component 130 may receive a command from the task selector component 120 to perform this step. The user input generator component 130 may determine the text data in a similar manner as described above in relation to FIG. 1 (e.g., using the NLG component 140).

The task execution component 160 may send (408) a command, along with a task ID, to the ER task component 190 to process the text data. The task ID may be determined by the task selector component 120 to track results for the instant task request. In response to receiving the command, the ER task component 190 may retrieve the text data, using the task ID, from a data storage, may perform ER processing. The ER task component 190 may perform ER processing for each synthetic user input, using the text data, may select an appropriate entity source corresponding to the user input (based on the intent and/or the domain), and may determine ER results data including an entity ID, from the selected entity source, for each entity included in the synthetic user input. As part of ER processing, the ER task component 190 may be configured to select one or more entity sources based on the intent and/or the domain corresponding to a user input. For example, the ER task component 190 may select a first music entity source and a second music entity source, when the user input corresponds to the music domain, and the retrieved entity IDs may correspond to a specific song from the first music entity source and a specific song from the second music entity source. As part of ER processing, the ER task component 190 may generate an N-best list or a ranked list of entity IDs, where the list may include entity IDs from different entity sources or the same entity source. For example, the ER task component 190 may determine that there are two entity IDs (e.g., one is an explicit version, one is a non-explicit version) corresponding to the specific song represented in the user input, and may include both of the entity IDs in the list.

The task execution component 160 may receive (410) the ER results data corresponding to the text data. The task execution component 160 may receive the ER results data from the ER task component 190 or may retrieve the ER results data from the ER results storage 192. In some embodiments, the task execution component 160 may receive a notification from the ER task component 190 that the task associated with the task ID is completed, in response to which, the task execution component 160 may retrieve the ER results data from the ER results storage 192 (or request the ER results data from the ER task component 190).

The task results component 165 may compare (step 412) the task request data (received in step 402; including the entity names, corresponding entity IDs and the indicated entity source) and the ER results data to determine if errors occurred. For example, in evaluating the ER processing task, the task results component 165 may determine whether the entity source selected by the ER task component 190 matches the entity source provided in the task request data. If the selected entity source does not match the ground truth entity source, it may indicate an error in how the ER task component 190 selects entity sources based on the intent and/or domain. The task results component 165 may determine whether the best/top scoring entity ID matches the entity ID provided in the task request data. The task results component 165 may also determine whether the entity ID provided in the task request data is included in the (N-best or ranked) list of entity IDs, if not as the best/top scoring entity ID. If the ground truth entity ID is included in the list of entity IDs outputted by the ER task component 190 but is not the best/top scoring entity ID, then that may indicate an error with the ranking technique used by the ER task component 190. As described above in relation to FIG. 1, the task results component 165 may associate an error indicator with ER data corresponding to synthetic user inputs that do not match the task request data (ground truth data). The task results component 165 may send (414), to a device (e.g., the device 102), the ER results data and the error indicators. The foregoing data may be sent when the user 105 requests to view the results of the task corresponding to the task data request (received in step 402).

In some embodiments, the task request data may not include an entity source, and the task request may relate to evaluating the ER task component 190 for all entity sources selected by the ER task component 190 based on the domain and/or intent. In some embodiments, the task request data may indicate that the ER processing task is to be restricted to the indicated entity source, and the task request may relate to evaluating how the ER task component 190 retrieves entity IDs from the specified entity source only.

Figure 5:
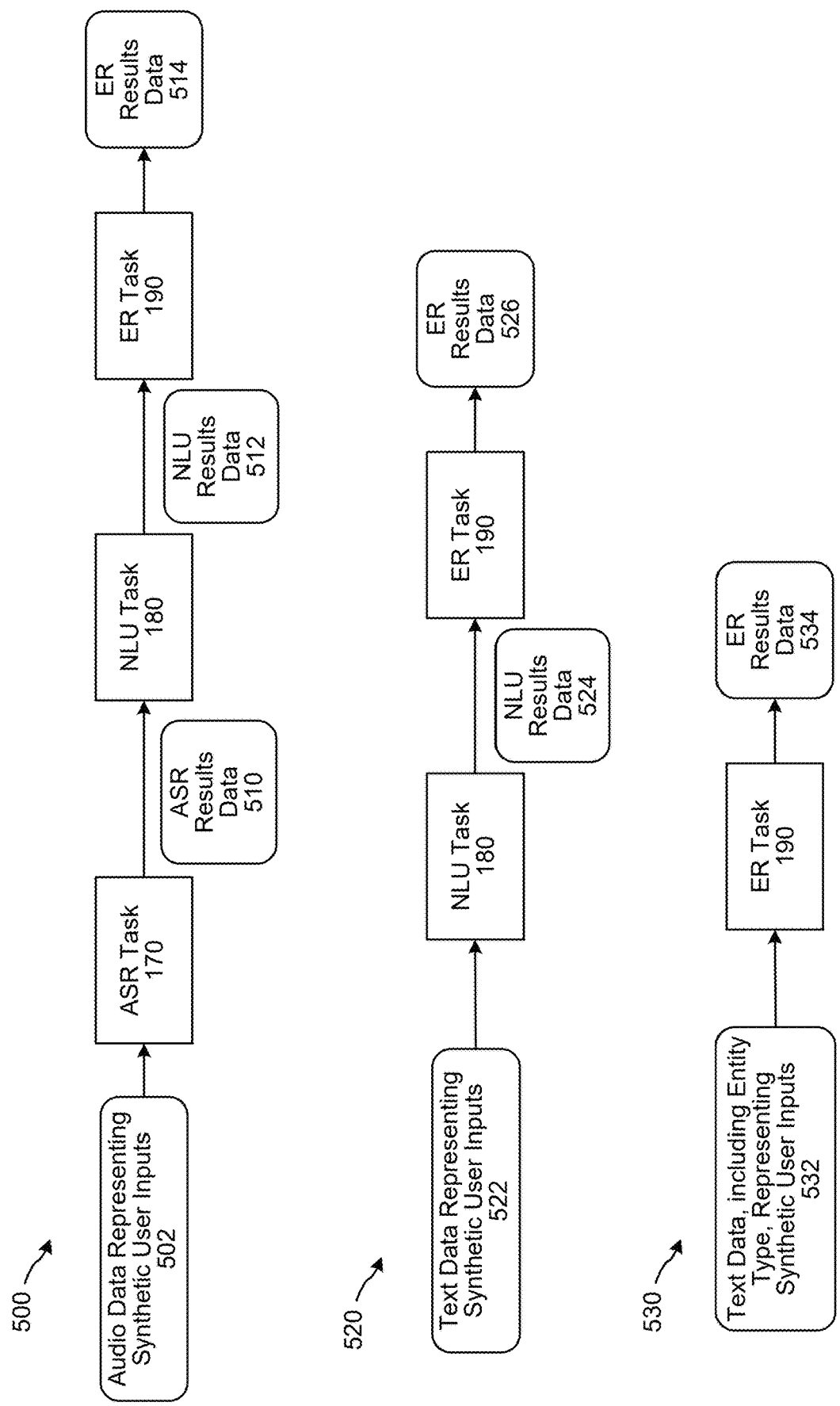
FIG. 5 conceptually illustrates workflows for evaluating different speech processing tasks, according to embodiments of the present disclosure.

FIG. 5 conceptually illustrates various workflows for evaluating different speech processing tasks. Shown in FIG. 5 is a workflow 500, which may be used to evaluate a speech processing pipeline involving ASR processing, NLU processing and ER processing. As shown, the workflow 500 may involve inputting audio data representing synthetic user inputs 502 to the ASR task component 170. The audio data 502 may be determined by the user input generator component 130 (e.g., using the NLG component 140 and the TTS component 145). The ASR task component 170 may output ASR results data 510, which may be inputted to the NLU task component 180. The NLU task component 180 may output NLU results data 512, which may be inputted to the ER task component 190. The ER task component 190 may output ER results data 514.

Shown in FIG. 5 is another workflow 520, which may be used to evaluate an speech processing pipeline involving NLU processing and ER processing. As shown, the workflow 500 may involve inputting text data representing synthetic user inputs 522 to the NLU task component 180. The text data 522 may be determined by the user input generator component 130 (e.g., using the NLG component 140). The NLU task component 180 may output NLU results data 524, which may be inputted to the ER task component 190. The ER task component 190 may output ER results data 526.

Shown in FIG. 5 is another workflow 530, which may be used to evaluate a speech processing pipeline involve ER processing. As shown, the workflow 530 may involve inputting text data, including entity type, representing synthetic user inputs 532 to the ER task component 190. The text data 532 may be determined by the user input generator 130 (e.g. using the NLG component 140), and may further be associated with the entity type corresponding to the entity name included in the synthetic user input. The entity type may be derived from the task request data/entity data provided by the user 105 when requesting the task. The ER task component 190 may output ER results data 534.

The ASR results data, the NLU results data and/or the ER results data may be used to update (retrain or configure) one or more of an ASR component (e.g., ASR component 950/1050), an NLU component (e.g., NLU component 960/1060) and an ER component (e.g., ER component 965/1065), so that user inputs received during runtime/production are processed successfully (resulting a desired response). For example, the ASR results data may be used to retrain the ASR task component 170, so that a user input that resulted an error, when previously processed by the ASR task component 170, is processed successfully after retraining.

Figure 6:
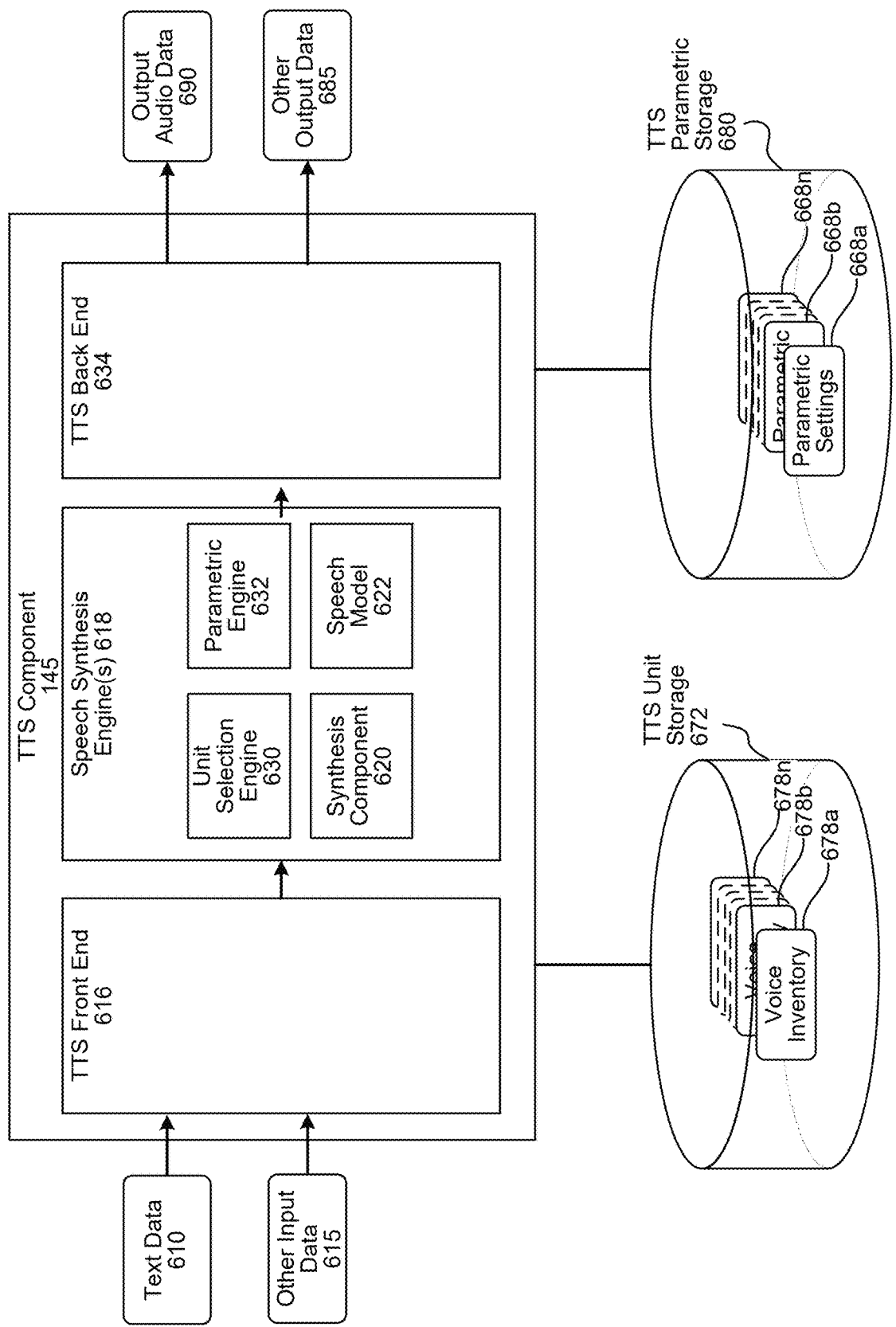
FIG. 6 is a conceptual diagram of text-to-speech components, according to embodiments of the present disclosure.

Components of a system that may be used to perform unit selection, parametric TTS processing, and/or model-based audio synthesis are shown in FIG. 6. As shown in FIG. 6, the TTS component 145 may include a TTS front end 616, a speech synthesis engine 618, TTS unit storage 672, TTS parametric storage 680, and a TTS back end 634. The TTS unit storage 672 may include, among other things, voice inventories 678a-678n that may include pre-recorded audio segments (called units) to be used by the unit selection engine 630 when performing unit selection synthesis as described below. The TTS parametric storage 680 may include, among other things, parametric settings 668a-668n that may be used by the parametric synthesis engine 632 when performing parametric synthesis as described below. A particular set of parametric settings 668 may correspond to a particular voice profile (e.g., whispered speech, excited speech, etc.).

In various embodiments of the present disclosure, model-based synthesis of audio data may be performed using by a speech model 622 and a TTS front end 616. The TTS front end 616 may be the same as front ends used in traditional unit selection or parametric systems. In other embodiments, some or all of the components of the TTS front end 616 are based on other trained models. The present disclosure is not, however, limited to any particular type of TTS front end 616. The speech model 622 may be used to synthesize speech without requiring the TTS unit storage 672 or the TTS parametric storage 680, as described in greater detail below.

TTS component receives text data 610. The data 610 may not necessarily be text, but may include other data (such as symbols, code, other data, etc.) that may reference text (such as an indicator of a word) that is to be synthesized. Thus data 610 may come in a variety of forms. The TTS front end 616 transforms the data 610 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 618. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 610, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 616 may also process other input data 615, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 610 and/or the text for a TTS request may be accompanied by separate metadata indicating what text should be whispered (or have some other indicated audio characteristic). The speech synthesis engine 618 may compare the annotated phonetic units models and information stored in the TTS unit storage 672 and/or TTS parametric storage 680 for converting the input text into speech. The TTS front end 616 and speech synthesis engine 618 may include their own controller(s)/processor(s) and memory or they may use the controller/processor and memory of the system 110, device 102, or other device, for example. Similarly, the instructions for operating the TTS front end 616 and speech synthesis engine 618 may be located within the TTS component 145, within the memory and/or storage of the system 110, device 102, or within an external device.

Text data 610 input into the TTS component 145 may be sent to the TTS front end 616 for processing. The front end 616 may include components for performing text normalization, linguistic analysis, linguistic prosody generation, or other such components. During text normalization, the TTS front end 616 may first process the text input and generate standard text, converting such things as numbers, abbreviations (such as Apt., St., etc.), symbols ($, %, etc.) into the equivalent of written out words.

During linguistic analysis, the TTS front end 616 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 145 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 672. The linguistic analysis performed by the TTS front end 616 may also identify different grammatical components such as prefixes, suffixes, phrases, punctuation, syntactic boundaries, or the like. Such grammatical components may be used by the TTS component 145 to craft a natural-sounding audio waveform output. The language dictionary may also include letter-to-sound rules and other tools that may be used to pronounce previously unidentified words or letter combinations that may be encountered by the TTS component 145. Generally, the more information included in the language dictionary, the higher quality the speech output.

Based on the linguistic analysis the TTS front end 616 may then perform linguistic prosody generation where the phonetic units are annotated with desired prosodic characteristics, also called acoustic features, which indicate how the desired phonetic units are to be pronounced in the eventual output speech. During this stage the TTS front end 616 may consider and incorporate any prosodic annotations that accompanied the text input to the TTS component 145. Such acoustic features may include syllable-level features, word-level features, emotion, speaker, accent, language, pitch, energy, duration, and the like. Application of acoustic features may be based on prosodic models available to the TTS component 145. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 616, which may be referred to as a symbolic linguistic representation, may include a sequence of phonetic units annotated with prosodic characteristics. This symbolic linguistic representation may be sent to the speech synthesis engine 618, which may also be known as a synthesizer, for conversion into an audio waveform of speech for output to an audio output device and eventually to a user. The speech synthesis engine 618 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 618 may perform speech synthesis using one or more different methods. In one method of synthesis called unit selection, described further below, a unit selection engine 630 matches the symbolic linguistic representation created by the TTS front end 616 against a database of recorded speech, such as a database (e.g., TTS unit storage 672) storing information regarding one or more voice corpuses (e.g., voice inventories 678*a-n*). Each voice inventory may correspond to various segments of audio that was recorded by a speaking human, such as a voice actor, where the segments are stored in an individual inventory 678 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 630 may then use the information about each unit to select units to be joined together to form the speech output.

The unit selection engine 630 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 620) to form output audio data 690 representing synthesized speech. Using all the information in the unit database, a unit selection engine 630 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis-called parametric synthesis-parameters such as frequency, volume, noise, are varied by a parametric synthesis engine 632, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 620) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 145 may be configured to perform TTS processing in multiple languages. For each language, the TTS component 145 may include specially configured data, instructions and/or components to synthesize speech in the desired language(s). To improve performance, the TTS component 145 may revise/update the contents of the TTS unit storage 672 based on feedback of the results of TTS processing, thus enabling the TTS component 145 to improve speech synthesis.

The TTS unit storage 672 may be customized for an individual user based on his/her individualized desired speech output. In particular, the speech unit stored in a unit database may be taken from input audio data of the user speaking. For example, to create the customized speech output of the system, the system may be configured with multiple voice inventories 678a-678n, where each unit database is configured with a different "voice" to match desired speech qualities. Such voice inventories may also be linked to user accounts. The voice selected by the TTS component 145 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 678 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 668) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 630 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 630. As part of unit selection, the unit selection engine 630 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 672 or in another storage component. For example, different unit selection databases may be stored in TTS unit storage 672. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 618 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 145 may include an acoustic model, or other models, which may convert a symbolic linguistic representation into a synthetic acoustic waveform of the text input based on audio signal manipulation. The acoustic model includes rules which may be used by the parametric synthesis engine 632 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 616.

The parametric synthesis engine 632 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 618, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 632 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 632 may lead to a number of potential audio output sequences. Based on the acoustic model and other potential models, the potential audio output sequences may be scored according to a confidence level of the parametric synthesis engine 632. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 668, which may represent acoustic settings matching a particular parametric "voice", may be used by the synthesis component 620 to ultimately create the output audio data 690.

When performing unit selection, after a unit is selected by the unit selection engine 630, the audio data corresponding to the unit may be passed to the synthesis component 620. The synthesis component 620 may then process the audio data of the unit to create modified audio data where the modified audio data reflects a desired audio quality. The synthesis component 620 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 145. For each unit that corresponds to the selected portion, the synthesis component 620 may process the audio data for that unit to create a modified unit audio data. The modified unit audio data may then be concatenated to form the output audio data 690. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 145. In that case, other output data 685 may be output along with the output audio data 690 so that an ultimate playback device (e.g., device 910) receives instructions for playback that can assist in creating the desired output audio. Thus, the other output data 685 may include instructions or other data indicating playback device settings (such as volume, playback rate, etc.) or other data indicating how output audio data including synthesized speech should be output. For example, for whispered speech, the output audio data 690 may include other output data 685 that may include a prosody tag or other indicator that instructs the device 910 to slow down the playback of the output audio data 690, thus making the ultimate audio sound more like whispered speech, which is typically slower than normal speech. In another example, the other output data 685 may include a volume tag that instructs the device 910 to output the speech at a volume level less than a current volume setting of the device 910, thus improving the quiet whisper effect.

Figure 7:
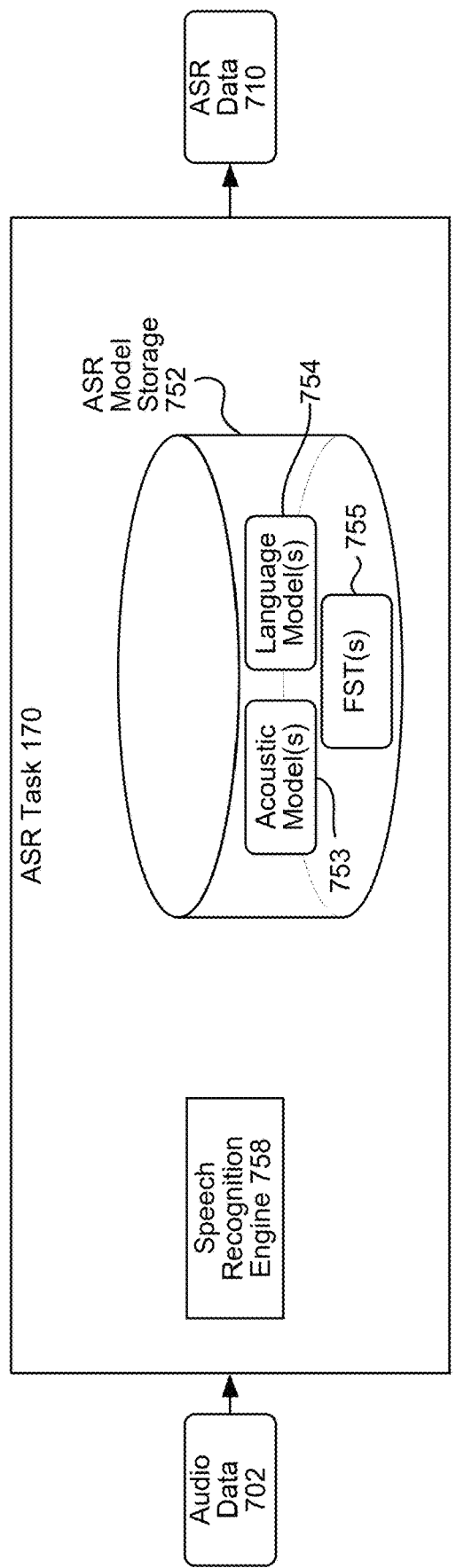
FIG. 7 is a conceptual diagram of an ASR component, according to embodiments of the present disclosure.

FIG. 7 is a conceptual diagram of an ASR task component 170, according to embodiments of the present disclosure. The ASR task component 170 may interpret a spoken natural language input based on the similarity between the spoken natural language input and pre-established language models 754 stored in an ASR model storage 752. For example, the ASR task component 170 may compare the audio data with models for sounds (e.g., subword units or phonemes) and sequences of sounds to identify words that match the sequence of sounds spoken in the natural language input. Alternatively, the ASR task component 170 may use a finite state transducer (FST) 755 to implement the language model functions.

When the ASR task component 170 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR task component 170 may output an ASR hypothesis that most likely matches the spoken natural language input, or may output multiple ASR hypotheses in the form of a lattice or an N-best list, with each ASR hypothesis corresponding to a respective score.

The ASR task component 170 may include a speech recognition engine 758. The ASR task component 170 receives audio data 911 (for example, received from a local device 910 having processed audio detected by a microphone by an acoustic front end (AFE) or other component). The speech recognition engine 758 compares the audio data 911 with acoustic models 753, language models 754, FST(s) 755, and/or other data models and information for recognizing the speech conveyed in the audio data. The audio data 911 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the audio data 911 with reference to information stored in the ASR model storage 752. Feature vectors of the audio data 911 may arrive at the system 110 encoded, in which case they may be decoded prior to processing by the speech recognition engine 758.

The speech recognition engine 758 attempts to match received feature vectors to language acoustic units (e.g., phonemes) and words as known in the stored acoustic models 753, language models 9B54, and FST(s) 755. For example, audio data 911 may be processed by one or more acoustic model(s) 753 to determine acoustic unit data. The acoustic unit data may include indicators of acoustic units detected in the audio data 911 by the ASR task component 170. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 754 (and/or using FST 755) to determine ASR data 710. The ASR data 710 can include one or more hypotheses. One or more of the hypotheses represented in the ASR data 710 may then be sent to further components (such as the NLU component 960) for further processing as discussed herein. The ASR data 710 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR task component 170 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR task component 170 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR task component 170 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 8:
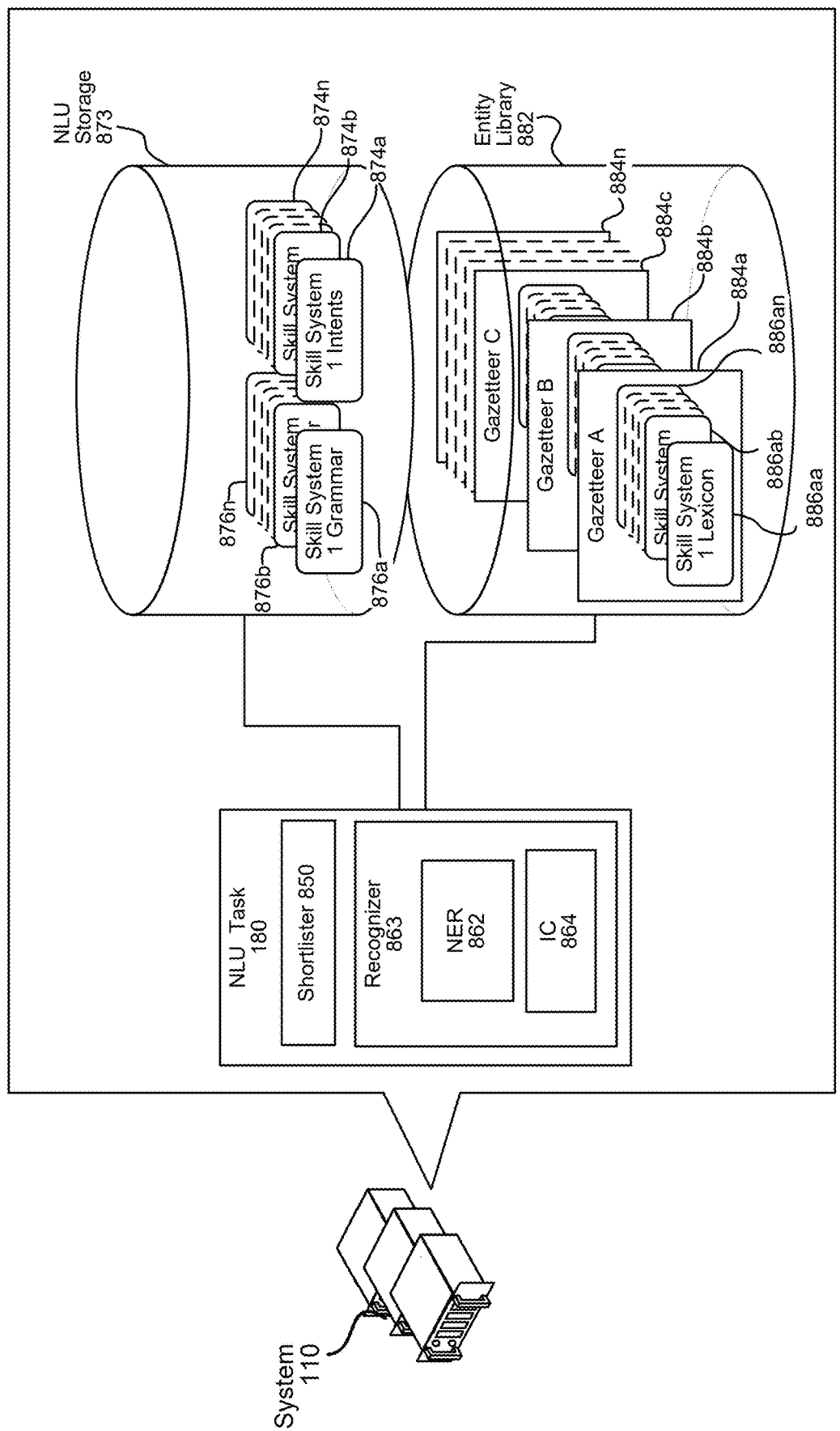
FIG. 8 is a conceptual diagram of how natural language processing may be performed, according to embodiments of the present disclosure.

FIG. 8 illustrates how NLU processing is performed on text data. The NLU task component 180 may process text data including several ASR hypotheses of a single user input. For example, if the ASR task component 170 outputs text data including an n-best list of ASR hypotheses, the NLU task component 180 may process the text data with respect to all (or a portion of) the ASR hypotheses represented therein.

The NLU task component 180 may annotate text data by parsing and/or tagging the text data. For example, for the text data "tell me the weather for Seattle," the NLU task component 180 may tag "tell me the weather for Seattle" as an <OutputWeather> intent as well as separately tag "Seattle" as a location for the weather information.

The NLU task component 180 may include a shortlister component 850. The shortlister component 850 selects skills that may execute with respect to ASR output data 710 input to the NLU task component 180 (e.g., applications that may execute with respect to the user input). The ASR output data 710 (which may also be referred to as ASR data 710) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU task component 180 may process ASR output data 710 input thereto with respect to every skill of the system, either in parallel, in series, or using some combination thereof. By implementing a shortlister component 850, the NLU task component 180 may process ASR output data 710 with respect to only the skills that may execute with respect to the user input. This reduces total compute power and latency attributed to NLU processing.

The shortlister component 850 may include one or more trained models. The model(s) may be trained to recognize various forms of user inputs that may be received by the system 922. For example, during a training period skill system(s) 125 associated with a skill may provide the system 922 with training text data representing sample user inputs that may be provided by a user to invoke the skill. For example, for a ride sharing skill, a skill system(s) 125 associated with the ride sharing skill may provide the system 922 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system 922 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system 922 with training text data indicating grammar and annotations. The system 922 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system 922 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 710 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU task component 180 may include one or more recognizers 863. In at least some embodiments, a recognizer 863 may be associated with a skill system 925 (e.g., the recognizer may be configured to interpret text data to correspond to the skill system 925). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 710 is potentially associated with multiple domains, the recognizers 863 associated with the domains may process the ASR output data 710, while recognizers 863 not indicated in the shortlister component 850's output may not process the ASR output data 710. The "shortlisted" recognizers 863 may process the ASR output data 710 in parallel, in series, partially in parallel, etc. For example, if ASR output data 710 potentially relates to both a communications domain and a music domain, a recognizer associated with the communications domain may process the ASR output data 710 in parallel, or partially in parallel, with a recognizer associated with the music domain processing the ASR output data 710.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU task component 180) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. The grammar databases 876, and intents/actions 874 may be stored in an NLU storage 873. Each gazetteer 884 may include domain/skill-indexed lexical information associated with a particular user and/or device 910. For example, a Gazetteer A (884a) includes skill-indexed lexical information 886aa to 886an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the device 910 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU task component 180 may utilize gazetteer information (884a-884n) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet,"

"volume off," and "mute" to a <Mute> intent. An IC component 864 identifies potential intents by comparing words and phrases in text data (representing at least a portion of the user input) to the words and phrases in an intents database 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

The shortlister component 850 may receive ASR output data 710 output from the ASR task component 170. The ASR task component 170 may embed the ASR output data 710 into a form processable by a trained model(s) using sentence embedding techniques as known in the art. Sentence embedding results in the ASR output data 710 including text in a structure that enables the trained models of the shortlister component 850 to operate on the ASR output data 710. For example, an embedding of the ASR output data 710 may be a vector representation of the ASR output data 710.

The shortlister component 850 may make binary determinations (e.g., yes or no) regarding which domains relate to the ASR output data 710. The shortlister component 850 may make such determinations using the one or more trained models described herein above. If the shortlister component 850 implements a single trained model for each domain, the shortlister component 850 may simply run the models that are associated with enabled domains as indicated in a user profile associated with the device 910 and/or user that originated the user input.

The shortlister component 850 may generate n-best list data representing domains that may execute with respect to the user input represented in the ASR output data 710. The size of the n-best list represented in the n-best list data is configurable. In an example, the n-best list data may indicate every domain of the system as well as contain an indication, for each domain, regarding whether the domain is likely capable to execute the user input represented in the ASR output data 710. In another example, instead of indicating every domain of the system, the n-best list data may only indicate the domains that are likely to be able to execute the user input represented in the ASR output data 710. In yet another example, the shortlister component 850 may implement thresholding such that the n-best list data may indicate no more than a maximum number of domains that may execute the user input represented in the ASR output data 710. In an example, the threshold number of domains that may be represented in the n-best list data is ten. In another example, the domains included in the n-best list data may be limited by a threshold a score, where only domains indicating a likelihood to handle the user input is above a certain score (as determined by processing the ASR output data 710 by the shortlister component 850 relative to such domains) are included in the n-best list data.

The ASR output data 710 may correspond to more than one ASR hypothesis. When this occurs, the shortlister component 850 may output a different n-best list (represented in the n-best list data) for each ASR hypothesis. Alternatively, the shortlister component 850 may output a single n-best list representing the domains that are related to the multiple ASR hypotheses represented in the ASR output data 710.

As indicated above, the shortlister component 850 may implement thresholding such that an n-best list output therefrom may include no more than a threshold number of entries. If the ASR output data 710 includes more than one ASR hypothesis, the n-best list output by the shortlister component 850 may include no more than a threshold number of entries irrespective of the number of ASR hypotheses output by the ASR task component 170. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 710, the shortlister component 850 may generate confidence scores representing likelihoods that domains relate to the ASR output data 710. If the shortlister component 850 implements a different trained model for each domain, the shortlister component 850 may generate a different confidence score for each individual domain trained model that is run. If the shortlister component 850 runs the models of every domain when ASR output data 710 is received, the shortlister component 850 may generate a different confidence score for each domain of the system. If the shortlister component 850 runs the models of only the domains that are associated with skills indicated as enabled in a user profile associated with the device 910 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 710.

N-best list data including confidence scores that may be output by the shortlister component 850 may be represented as, for example:

Search domain, 0.67
Recipe domain, 0.62
Information domain, 0.57
Shopping domain, 0.42

As indicated, the confidence scores output by the shortlister component 850 may be numeric values. The confidence scores output by the shortlister component 850 may alternatively be binned values (e.g., high, medium, low).

The n-best list may only include entries for domains having a confidence score satisfying (e.g., equaling or exceeding) a minimum threshold confidence score. Alternatively, the shortlister component 850 may include entries for all domains associated with user enabled skills, even if one or more of the domains are associated with confidence scores that do not satisfy the minimum threshold confidence score.

The shortlister component 850 may send the ASR output data 710 to recognizers 863 associated with domains represented in the n-best list data. If the shortlister component 850 generates an n-best list representing domains without any associated confidence scores, the shortlister component 850 may send the ASR output data 710 to recognizers 863 associated with domains that the shortlister component 850 determines may execute the user input. If the shortlister component 850 generates an n-best list representing domains with associated confidence scores, the shortlister component 850 may send the ASR output data 710 to recognizers 863 associated with domains associated with confidence scores satisfying (e.g., meeting or exceeding) a threshold minimum confidence score.

A recognizer 863 may output tagged text data generated by an NER component 862 and an IC component 864, as described herein above. The NLU task component 180 may compile the output tagged text data of the recognizers 863 into a single cross-domain n-best list and may send the cross-domain n-best list to a pruning component. Each entry of tagged text (e.g., each NLU hypothesis) represented in the cross-domain n-best list data may be associated with a respective score indicating a likelihood that the NLU hypothesis corresponds to the domain associated with the recognizer 863 from which the NLU hypothesis was output. For example, the cross-domain n-best list data may be represented as (with each line corresponding to a different NLU hypothesis):

[0.95] Intent: <PlayMusic> ArtistName: Beethoven SongName: Waldstein Sonata
[0.70] Intent: <Play Video> ArtistName: Beethoven VideoName: Waldstein Sonata
[0.01] Intent: <PlayMusic> ArtistName: Beethoven AlbumName: Waldstein Sonata
[0.01] Intent: <PlayMusic> SongName: Waldstein Sonata The pruning component may sort the NLU hypotheses represented in the cross-domain n-best list data according to their respective scores. The pruning component may perform score thresholding with respect to the cross-domain NLU hypotheses. For example, the pruning component may select NLU hypotheses associated with scores satisfying (e.g., meeting and/or exceeding) a threshold score. The pruning component may also or alternatively perform number of NLU hypothesis thresholding. For example, the pruning component may select the top scoring NLU hypothesis(es). The pruning component may output a portion of the NLU hypotheses input thereto. The purpose of the pruning component is to create a reduced list of NLU hypotheses so that downstream, more resource intensive, processes may only operate on the NLU hypotheses that most likely represent the user's intent.

The NLU results data outputted by the NLU task component 180 may be the cross-domain n-best list data, which may be input to the ER task component 190. The ER task component 190 can apply rules or other instructions to standardize labels or tokens from previous stages into an intent/slot representation. The precise transformation may depend on the domain. For example, for a travel domain, the ER task component 1070 may transform text corresponding to "Boston airport" to the standard BOS three-letter code referring to the airport. The ER task component 190 can refer to the entity source (provided by the user 105) and/or a general knowledge base to specifically identify the precise entity referred to in each entity name/slot of each NLU hypothesis represented in the cross-domain n-best list data. The ER task component 190 may output an n-best list that is based on the cross-domain n-best list but that also includes more detailed information, such as entity IDs about the specific entities mentioned in the NLU hypotheses.

Figure 9:
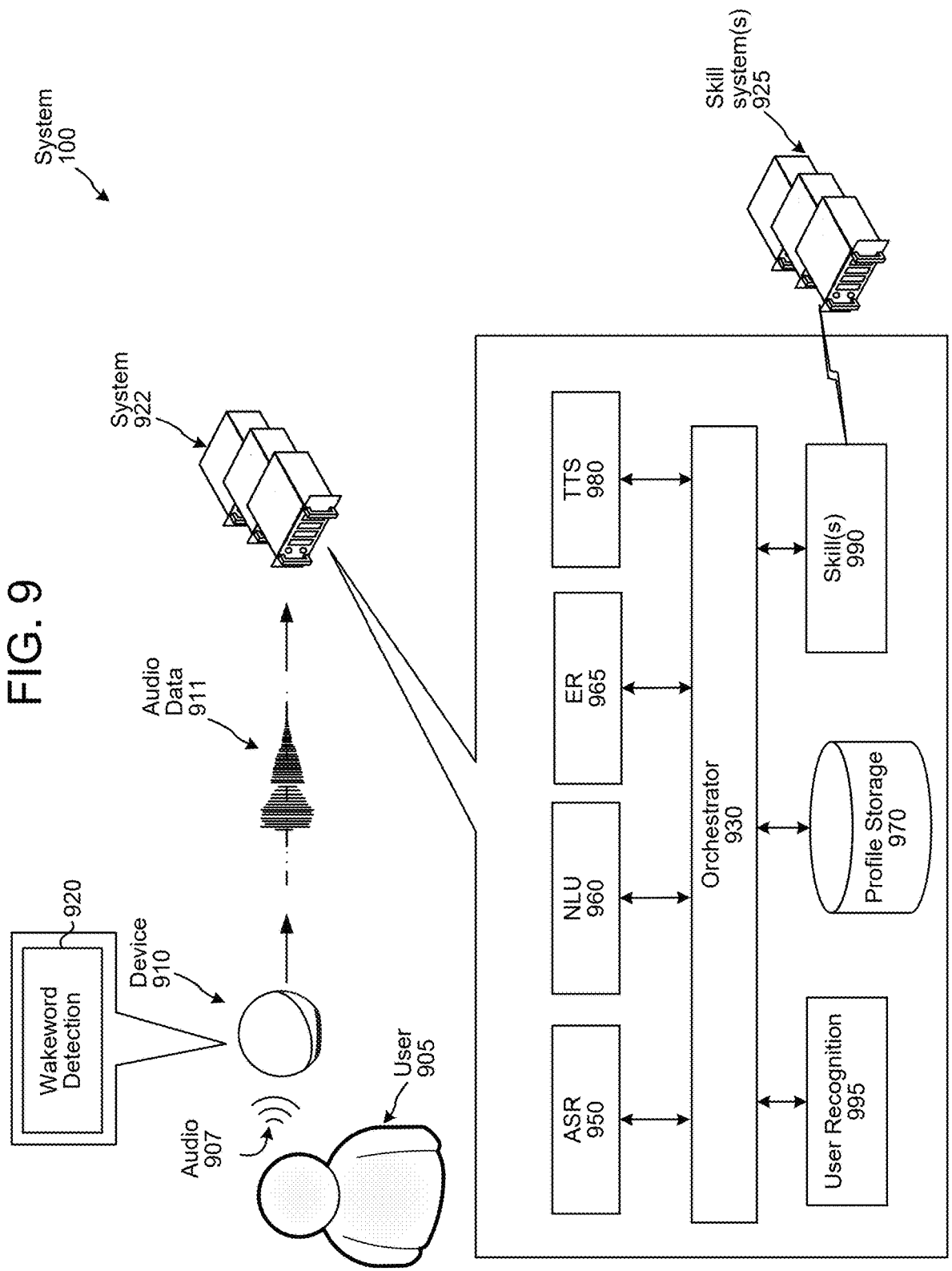
FIG. 9 is a conceptual diagram of components of the system, according to embodiments of the present disclosure.

A production/runtime speech processing system may operate using various components as illustrated in FIG. 9 to process user inputs received from a user 905. The various components may be located on a same or different physical devices. Communication between various components may occur directly or across a network(s) 199.

A microphone or array of microphones (of or otherwise associated with the device 910) may capture audio 907 from the user 905. The device 910 processes audio data 911, representing the audio 907, to determine whether speech is detected. The device 910 may use various techniques to determine whether audio data includes speech. In some examples, the device 910 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 910 may implement a classifier configured to distinguish speech from background noise. The classifier may be implemented by techniques such as linear classifiers, support vector machines, and decision trees. In still other examples, the device 910 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data 911.

Once speech is detected in audio data 911, the device 910 may determine if the speech is directed at the device 910/system 922. In at least some embodiments, such determination may be made using the wakeword detection component 920. The wakeword detection component 920 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 920 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 920 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used. In various embodiments, the device 910 may behave differently depending on which wakeword is used. For example, in a multi-user environment, different users may use different wakewords, and the device 910 may tailor its operation in response to a particular user/wakeword matching. The device 910 may, for example, access a user profile associated with a particular wakeword and load device preferences or device usage history stored in the user profile. In other embodiments, a first wakeword may be associated with a first mode of operation of the device 910 and a second wakeword may be associated with a second mode of operation of the device 910. The first mode of operation may be, for example, a personal assistant, and the second mode of operation may be navigation (such as automobile navigation).

In another example, the device 910 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 910 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword detection component 920 detects a wakeword, the device 910 may "wake" and begin transmitting audio data 911, representing the audio 907, to the system 922 or to other components included in the device 910. The audio data 911 may include the detected wakeword, or the device 910 may remove the portion of the audio data, corresponding to the detected wakeword, prior to sending the audio data 911 to the system 922/other components of the device 910.

The system 922 may include an orchestrator component 930 configured to, among other things, coordinate data transmissions between components of the system 922. The orchestrator component 930 may receive the audio data 911 from the device 910, and send the audio data 911 to an ASR component 950. The ASR component 950 may be similar to the ASR task component 170 and may perform similar functionalities.

The ASR component 950 transcribes the audio data 911 into ASR data including one or more ASR hypotheses. An ASR hypothesis may be configured as a textual interpretation of the speech in the audio data 911, or may be configured in another manner, such as one or more tokens. Each ASR hypothesis may represent a different likely interpretation of the speech in the audio data 911. Each ASR hypothesis may be associated with a score (e.g., confidence score, probability score, or the like) representing the associated ASR hypothesis correctly represents the speech in the audio data 911.

The ASR component 950 interprets the speech in the audio data based on a similarity between the audio data and pre-established language models. For example, the ASR component 950 may compare the audio data 1011 with models for sounds (e.g., subword units, such as phonemes, etc.) and sequences of sounds to identify words that match the sequence of sounds of the speech represented in the audio data. In some embodiments, the ASR component 950 may use acoustic models and language models to determine one or more words represented in the speech in the audio data.

In some embodiments, the ASR component 950 may use a neural network, such as, a recurrent neural network (RNN) (or other type of neural networks) to determine the ASR data corresponding to the speech captured in the audio data. In some embodiments, the ASR component 950 may use a RNN-transducer model, which may feed the prediction from a previous time step (e.g., a predicted token corresponding to a previous audio frame) an input layer to process the next time step (e.g., to predict the next token corresponding to the subsequent/next audio frame).

In at least some instances, instead of the device 910 receiving a spoken natural language input, the device 910 may receive a textual (e.g., types) natural language input. The device 910 may determine text data representing the textual natural language input, and may send the text data to the system 922, wherein the text data is received by the orchestrator component 930. The orchestrator component 930 may send the text data or ASR data, depending on the type of natural language input received, to a NLU component 960. The NLU component 960 may be similar to the NLU task component 180 and may perform similar functionalities.

The NLU component 960 processes the ASR data or text data to determine one or more NLU hypotheses embodied in NLU output data. The NLU component 960 may perform intent classification (IC) processing on the ASR output data or text data to determine an intent of the natural language input. An intent corresponds to an action to be performed that is responsive to the natural language input. To perform IC processing, the NLU component 960 may communicate with a database of words linked to intents. For example, a music intent database may link words and phrases such as "quiet," "volume off," and "mute" to a <Mute> intent. The NLU component 960 identifies intents by comparing words and phrases in ASR output data or text data to the words and phrases in an intents database. In some embodiments, the NLU component 960 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 960 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 960 may be linked to one or more grammar frameworks with entity types to be populated with entity values. Each entity type of a grammar framework corresponds to a portion of ASR output data or text data that the NLU component 960 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 960 may perform NER processing to identify words in ASR output data or text data as subject, object, verb, preposition, etc. based on grammar rules and/or models. Then, the NLU component 960 may perform IC processing using the identified verb to identify an intent. Thereafter, the NLU component 960 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 960 may generate NLU output data including one or more NLU hypotheses, with each NLU hypothesis including an intent and optionally one or more entity types and corresponding entity values. In some embodiments, the NLU component 960 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

The system 922 may further include an ER component 965 configured to perform entity resolution using the NLU hypotheses determined by the NLU component 960. The ER component 965 may be configured to determine specific entities included in the user input represented in the audio data 911. The ER component 965 may be similar to the ER task component 190 and may perform similar functionalities. In some example embodiments, the ER component 965 may be included in the NLU component 960.

As described above, the system 922 may perform speech processing using two different components (e.g., the ASR component 150 and the NLU component 960). In at least some embodiments, the system 922 may implement a spoken language understanding (SLU) component configured to process audio data 911 to determine NLU output data.

The SLU component may be equivalent to a combination of the ASR component 150 and the NLU component 960. Yet, the SLU component may process audio data 911 and directly determine the NLU output data, without an intermediate step of generating ASR output data. As such, the SLU component may take audio data 911 representing a spoken natural language input and attempt to make a semantic interpretation of the spoken natural language input. That is, the SLU component may determine a meaning associated with the spoken natural language input and then implement that meaning. For example, the SLU component may interpret audio data 911 representing a spoken natural language input in order to derive a desired action. The SLU component may output a most likely NLU hypothesis, or multiple NLU hypotheses associated with respective confidence or other scores (such as probability scores, etc.).

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As used herein, a "skill" may refer to software, that may be placed on a machine or a virtual machine (e.g., software that may be launched in a virtual instance when called), configured to process natural language understanding (NLU) output data (e.g., including an intent and optionally one or more entities) and perform one or more actions in response thereto. What is referred to herein as a skill may sometimes be referred to as an application, bot, action, or the like. A group of skills of related functionality may be associated with a domain. For example, a first music skill and a second music skill may be associated with a music domain.

The system 922 may include one or more skill components 990 and/or may communicate with one or more skill systems 925. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 910, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill 990 may operate in conjunction between the system 922 and other devices, such as the device 910, a restaurant electronic ordering system, a taxi electronic booking system, etc. in order to complete certain functions. Inputs to a skill 990 may come from speech processing interactions or through other interactions or input sources.

A skill 990 may be associated with a domain, a non-limiting list of which includes a smart home domain, a music domain, a video domain, a weather domain, a communications domain, a flash briefing domain, a shopping domain, and a custom domain.

The system 922 may include a TTS component 980 that generates audio data including synthesized speech. The data input to the TTS component 980 may come from a skill system 925, the orchestrator component 930, or another component of the system 922. The TTS component 980 may be similar to the TTS component 145 and may perform similar functionalities.

In one method of synthesis called unit selection, the TTS component 980 matches input data against a database of recorded speech. The TTS component 980 selects matching units of recorded speech and concatenates the units together to form audio data. In another method of synthesis called parametric synthesis, the TTS component 980 varies parameters such as frequency, volume, and noise to determine audio data including an artificial speech waveform. Parametric synthesis uses a computerized voice generator, sometimes called a vocoder.

The system 922 may include a user recognition component 995. The user recognition component 995 may recognize one or more users using various data. The user recognition component 995 may take as input the audio data 911. The user recognition component 995 may perform user recognition by comparing speech characteristics, in the audio data 911, to stored speech characteristics of users. The user recognition component 995 may additionally or alternatively perform user recognition by comparing biometric data (e.g., fingerprint data, iris data, retina data, etc.), received by the system 922 in correlation with a natural language input, to stored biometric data of users. The user recognition component 995 may additionally or alternatively perform user recognition by comparing image data (e.g., including a representation of at least a feature of a user), received by the system 922 in correlation with a natural language input, with stored image data including representations of features of different users. The user recognition component 995 may perform other or additional user recognition processes, including those known in the art. For a particular natural language input, the user recognition component 995 may perform processing with respect to stored data of users associated with the device 910 that received the natural language input.

The user recognition component 995 determines whether a natural language input originated from a particular user. For example, the user recognition component 995 may determine a first value representing a likelihood that a natural language input originated from a first user, a second value representing a likelihood that the natural language input originated from a second user, etc. The user recognition component 995 may also determine an overall confidence regarding the accuracy of user recognition processing.

The user recognition component 995 may output a single user identifier corresponding to the most likely user that originated the natural language input. Alternatively, the user recognition component 995 may output multiple user identifiers (e.g., in the form of an N-best list) with respective values representing likelihoods of respective users originating the natural language input. The output of the user recognition component 995 may be used to inform NLU processing, processing performed by a skill system 925, as well as processing performed by other components of the system 922 and/or other systems.

The system 922 may include profile storage 970. The profile storage 970 may include a variety of data related to individual users, groups of users, devices, etc. that interact with the system 922. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 970 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skill systems 925 that the user has enabled. When a user enables a skill system 925, the user is providing the system 922 with permission to allow the skill system 925 to execute with respect to the user's natural language inputs. If a user does not enable a skill system 925, the system 922 may not execute the skill system 925 with respect to the user's natural language inputs.

The profile storage 970 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 970 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 10:
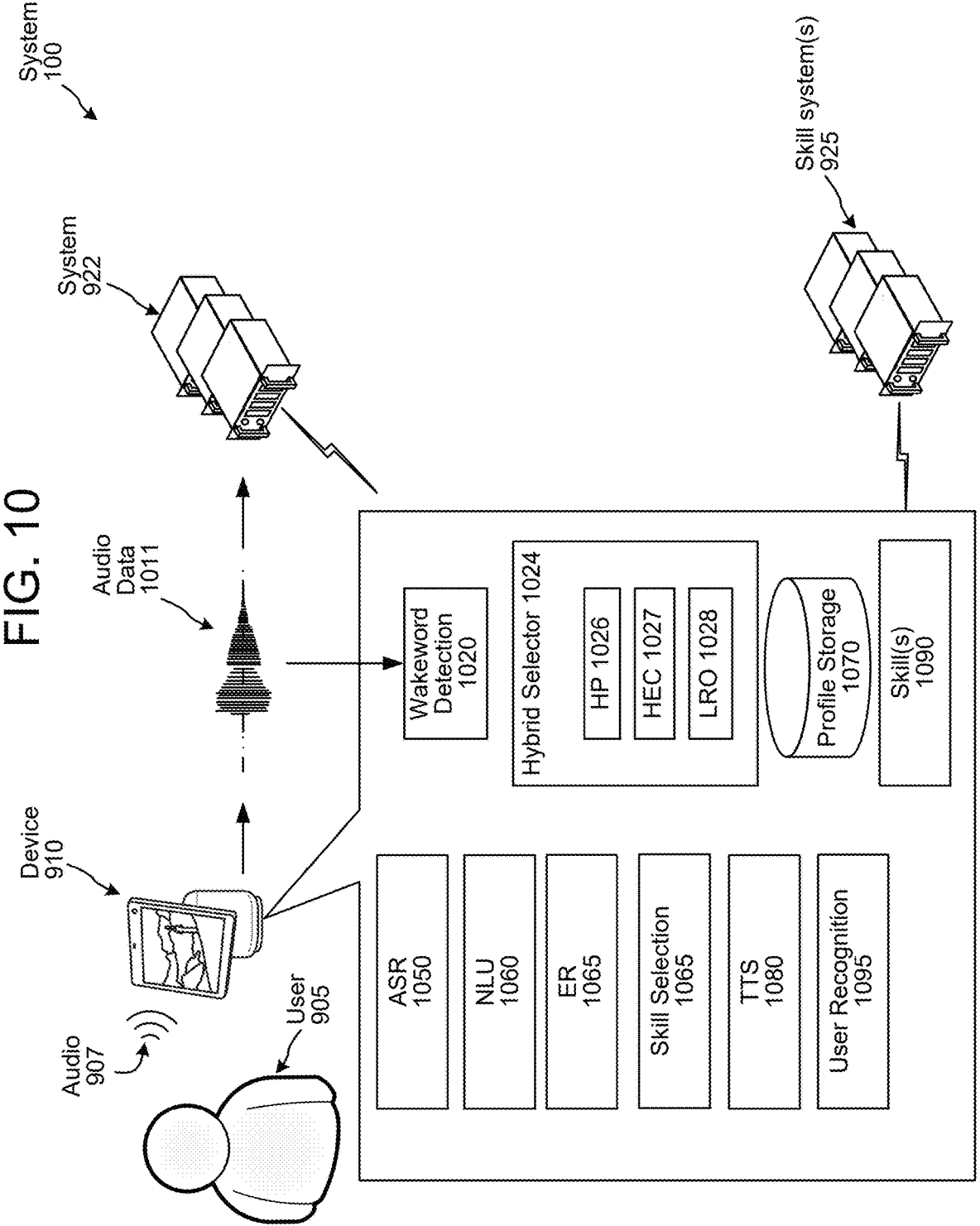
FIG. 10 is a conceptual diagram illustrating components that may be included in a device, according to embodiments of the present disclosure.

The foregoing describes illustrative components and processing of the system 922. The following describes illustrative components and processing of the device 910. As illustrated in FIG. 10, in at least some embodiments the system 922 may receive audio data 1011 from the device 910, to recognize speech corresponding to a spoken natural language in the received audio data 1011, and to perform functions in response to the recognized speech. In at least some embodiments, these functions involve sending directives (e.g., commands), from the system 922 to the device 910 to cause the device 910 to perform an action, such as output synthesized speech (responsive to the spoken natural language input) via a loudspeaker(s), and/or control one or more secondary devices by sending control commands to the one or more secondary devices.

Thus, when the device 910 is able to communicate with the system 922 over the network(s) 199, some or all of the functions capable of being performed by the system 922 may be performed by sending one or more directives over the network(s) 199 to the device 910, which, in turn, may process the directive(s) and perform one or more corresponding actions. For example, the system 922, using a remote directive that is included in response data (e.g., a remote response), may instruct the device 910 to output synthesized speech via a loudspeaker(s) of (or otherwise associated with) the device 910, to output content (e.g., music) via the loudspeaker(s) of (or otherwise associated with) the device 910, to display content on a display of (or otherwise associated with) the device 910, and/or to send a directive to a secondary device (e.g., a directive to turn on a smart light). It will be appreciated that the system 922 may be configured to provide other functions in addition to those discussed herein, such as, without limitation, providing step-by-step directions for navigating from an origin location to a destination location, conducting an electronic commerce transaction on behalf of the user 905 as part of a shopping function, establishing a communication session (e.g., an audio or video call) between the user 905 and another user, and so on.

The device 910 may include a wakeword detection component 1020 configured to detect a wakeword (e.g., "Alexa") that indicates to the device 910 that the audio data 1011 is to be processed for determining NLU output data. In at least some embodiments, a hybrid selector 1024, of the device 910, may send the audio data 1011 to the wakeword detection component 1020. If the wakeword detection component 1020 detects a wakeword in the audio data 1011, the wakeword detection component 1020 may send an indication of such detection to the hybrid selector 1024. In response to receiving the indication, the hybrid selector 1024 may send the audio data 1011 to the system 922 and/or an on-device ASR component 1050. The wakeword detection component 1020 may also send an indication, to the hybrid selector 1024, representing a wakeword was not detected. In response to receiving such an indication, the hybrid selector 1024 may refrain from sending the audio data 1011 to the system 922, and may prevent the on-device ASR component 1050 from processing the audio data 1011. In this situation, the audio data 1011 can be discarded.

The device 910 may conduct its own speech processing using on-device language processing components (such as an on-device SLU component, an on-device ASR component 1050, and/or an on-device NLU component 1060) similar to the manner discussed above with respect to the speech processing system-implemented ASR component 950, and NLU component 960. The device 910 may also internally include, or otherwise have access to, other components such as one or more skills 1090 (similar to the skills 990), a user recognition component 1095 (configured to process in a similar manner to the user recognition component 995), profile storage 1070 (configured to store similar profile data to the profile storage 970), a TTS component 1080 (configured to process in a similar manner to the TTS component 980), and other components. In some embodiments, such components, on the device 910, may be personalized/customized for a user or a group of users associated with the device 910. In at least some embodiments, the on-device profile storage 1070 may only store profile data for a user or group of users specifically associated with the device 910.

In at least some embodiments, the on-device language processing components may not have the same capabilities as the language processing components implemented by the system 922. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 922. If the device 910 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 922.

The hybrid selector 1024, of the device 910, may include a hybrid proxy (HP) 1026 configured to proxy traffic to/from the system 922. For example, the HP 1026 may be configured to send messages to/from a hybrid execution controller (HEC) 1027 of the hybrid selector 1024. For example, command/directive data received from the system 922 can be sent to the HEC 1027 using the HP 1026. The HP 1026 may also be configured to allow the audio data 1011 to pass to the system 922 while also receiving (e.g., intercepting) this audio data 1011 and sending the audio data 1011 to the HEC 1027.

In at least some embodiments, the hybrid selector 1024 may further include a local request orchestrator (LRO) 1028 configured to notify the on-device ASR component 150 about the availability of the audio data 1011, and to otherwise initiate the operations of on-device language processing when the audio data 1011 becomes available. In general, the hybrid selector 1024 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 910 receives directive data from the system 922 and chooses to use that remotely-determined directive data.

Thus, when the audio data 1011 is received, the HP 1026 may allow the audio data 1011 to pass through to the system 922 and the HP 1026 may also input the audio data 1011 to the on-device ASR component 150 by routing the audio data 1011 through the HEC 1027 of the hybrid selector 1024, whereby the LRO 1028 notifies the on-device ASR component 150 of the audio data 1011. At this point, the hybrid selector 1024 may wait for response data from either or both the system 922 and/or the on-device language processing components. However, the disclosure is not limited thereto, and in some examples the hybrid selector 1024 may send the audio data 1011 only to the on-device ASR component 150 without departing from the disclosure. For example, the device 910 may process the audio data 1011 on-device without sending the audio data 1011 to the system 922.

The on-device ASR component 1050 is configured to receive the audio data 1011 from the hybrid selector 1024, and to recognize speech in the audio data 1011, and the on-device NLU component 1060 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 1060) may be selected as usable to respond to a natural language input, and local response data may be sent (e.g., local NLU output data, local knowledge base information, internet search results, and/or local directive data) to the hybrid selector 1024, such as a "ReadyToExecute" response. The hybrid selector 1024 may then determine whether to use directive data from the on-device components to respond to the natural language input, to use directive data received from the system 922, assuming a remote response is even received (e.g., when the device 910 is able to access the system 922 over the network(s) 199), or to determine output data requesting additional information from the user 905.

The device 910 and/or the system 922 may associate a unique identifier with each natural language input. The device 910 may include the unique identifier when sending the audio data 1011 to the system 922, and the response data from the system 922 may include the unique identifier to identify to which natural language input the response data corresponds.

In at least some embodiments, the device 910 may include one or more skill components 990. The skill component(s) 990 installed on (or in communication with) the device 910 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
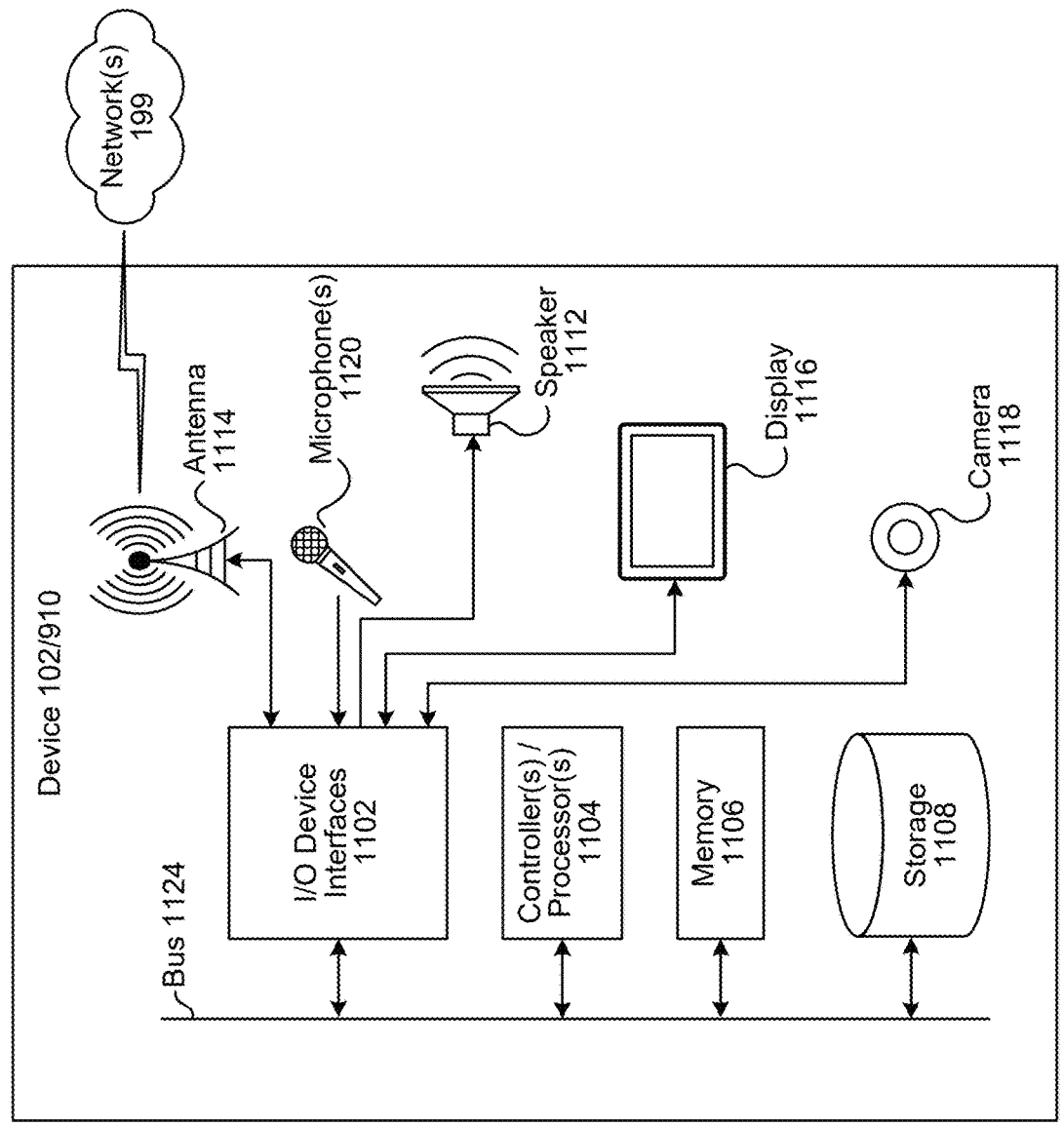
FIG. 11 is a block diagram conceptually illustrating example components of a device, according to embodiments of the present disclosure.
Figure 12:
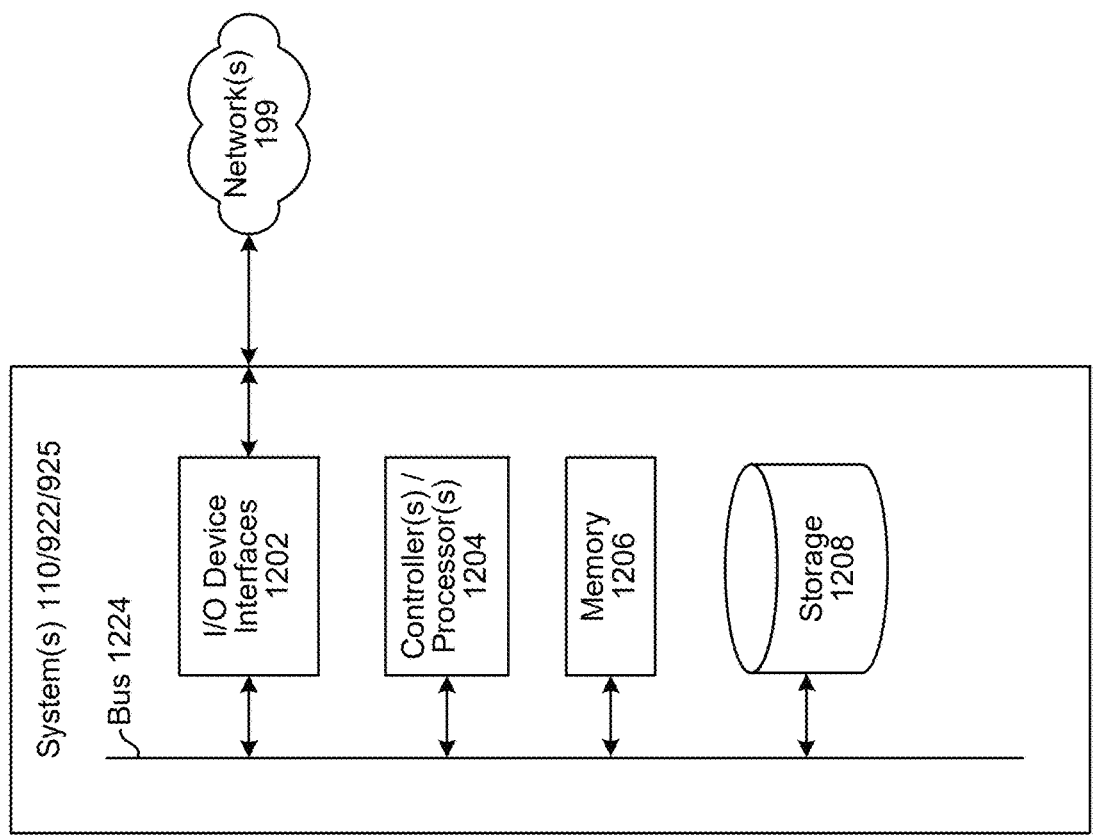
FIG. 12 is a block diagram conceptually illustrating example components of a system, according to embodiments of the present disclosure.

FIG. 11 is a block diagram conceptually illustrating a device 102/910 of the system 100. FIG. 12 is a block diagram conceptually illustrating example components of a remote device, such as the system 110, the system 922 and the skill(s) system 925. A system (110/922/925) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (110/922/925) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (110/922/925) may be included in the system 100 of the present disclosure, such as, one or more systems 922 and/or one or more skills 925. In operation, each of these systems may include computer-readable and computer-executable instructions that reside on the respective device (110/922/925), as will be discussed further below.

Each of these devices (102/110/910/922/925) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (910/922/925) may also include a data storage component (1108/1208) for storing data and controller/processor-executable instructions. Each data storage component (1108/1208) may individually include one or more non-volatile storage types such as magnetic storage, optical storage, solid-state storage, etc. Each device (102/110/910/922/925) may also be connected to removable or external non-volatile memory and/or storage (such as a removable memory card, memory key drive, networked storage, etc.) through respective input/output device interfaces (1102/1202).

Computer instructions for operating each device (102/110/910/922/925) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (102/110/910/922/925) includes input/output device interfaces (1102/1202). A variety of components may be connected through the input/output device interfaces (1102/1202), as will be discussed further below. Additionally, each device (102/110/910/922/925) may include an address/data bus (1124/1224) for conveying data among components of the respective device. Each component within a device (102/110/910/922/925) may also be directly connected to other components in addition to (or instead of) being connected to other components across the bus (1124/1224).

Referring to FIG. 11, the device 102/910 may include input/output device interfaces 1102 that connect to a variety of components such as an audio output component such as a speaker 1112, a wired headset or a wireless headset (not illustrated), or other component capable of outputting audio. The device 102/910 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 102/910 may additionally include a display 1116 for displaying content. The device 102/910 may further include a camera 1118.

Via antenna(s) 1114, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device 102, the device 910, the system 102, the system 922, and/or skill 925 may include their own dedicated processors, memory, and/or storage. Alternatively, one or more of the components of the device 102, the device 910, the system 102, the system 922, and/or skill 925 may utilize the I/O interfaces (1102/1202), processor(s) (1104/1204), memory (1106/1206), and/or storage (1108/1208) of the device 102, the device 910, the system 102, the system 922, and/or skill 925, respectively.

As noted above, multiple devices may be employed in a single system. In such a multi-device system, each of the devices may include different components for performing different aspects of the system's processing. The multiple devices may include overlapping components. The components of the device 102, the device 910, the system 110, the system 922, and the skill 925, as described herein, are illustrative, and may be located as a stand-alone device or may be included, in whole or in part, as a component of a larger device or system.

Figure 13:
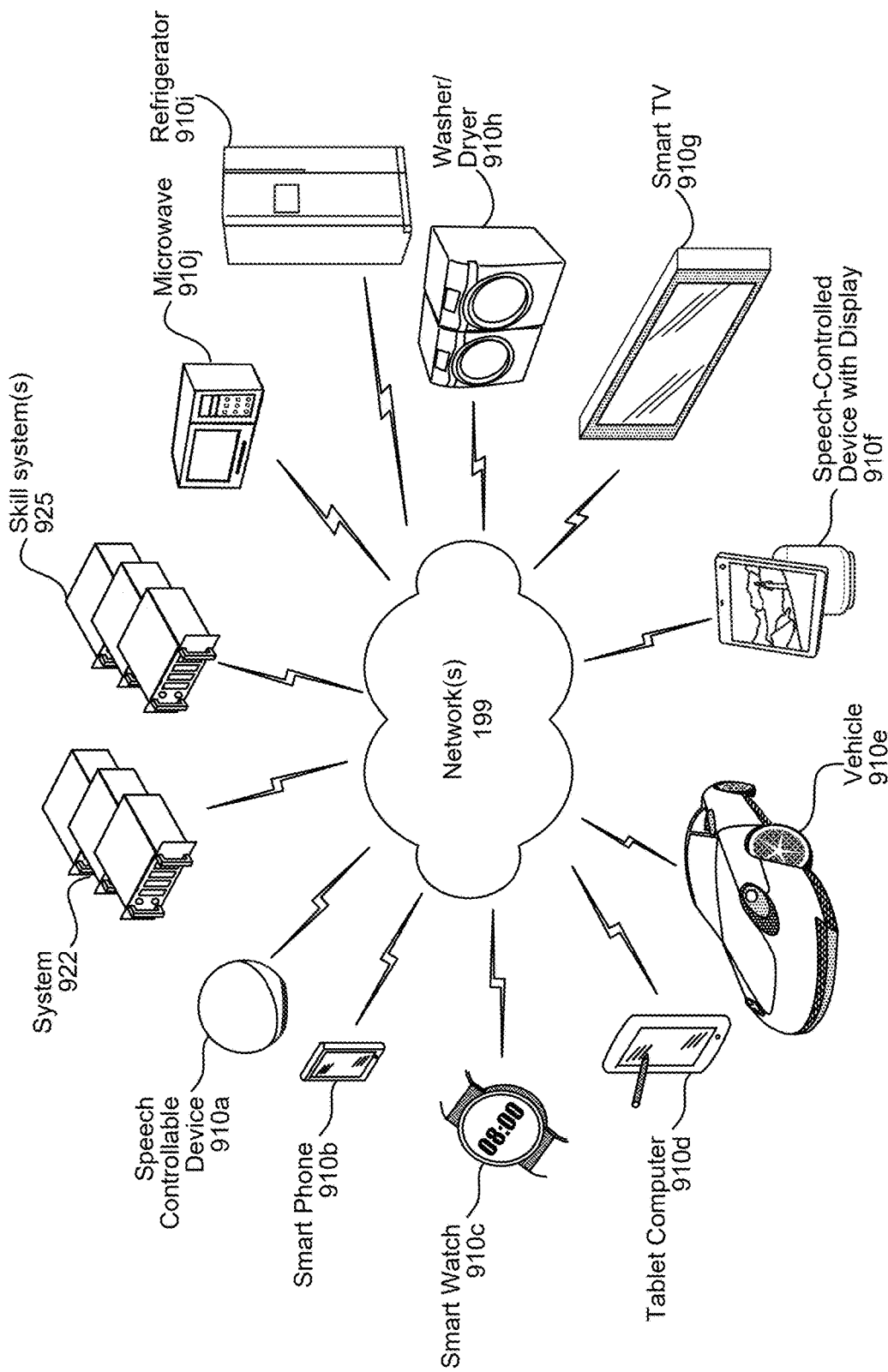
FIG. 13 illustrates an example of a computer network for use with the overall system, according to embodiments of the present disclosure.

As illustrated in FIG. 13, multiple devices (910a-910j, 922, 925) may contain components of the system, and the devices may be connected over a network(s) 199. The network(s) 199 may include a local or private network or may include a wide network such as the Internet. Devices may be connected to the network(s) 199 through either wired or wireless connections. For example, a speech-controllable device 910a, a smart phone 910b, a smart watch 910c, a tablet computer 910d, a vehicle 910e, a speech-controllable display device 910f, a smart television 910g, a washer/dryer 910h, a refrigerator 910i, and/or a microwave 910j may be connected to the network(s) 199 through a wireless service provider, over a Wi-Fi or cellular network connection, or the like. Other devices are included as network-connected support devices, such as the system 922, the skill 925, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, from a device, a task request to evaluate processing performed by speech processing components with respect to a first entity name and an intent, the first entity name being associated with a first entity identifier;
    determining first text data representing a first machine-generated input including the first entity name and corresponding with the intent;
    determining, using the first text data, audio data corresponding to synthesized speech representing the first machine-generated input;
    determining automatic speech recognition (ASR) results data corresponding to the audio data;
    determining first natural language understanding (NLU) results data corresponding to the ASR results data;
    sending, to an entity resolution (ER) task component, a first command to perform ER processing with respect to the first NLU results data;
    receiving, from the ER task component, first ER results data corresponding to the first NLU results data, the first ER results data including a second entity identifier;
    determining, using the entity data and the first ER results data, that the first entity identifier is different than the second entity identifier; and
    sending, to the device, first data representing processing of the first machine-generated input results in identification of an improper entity identifier.

2. The computer-implemented method of claim 1, wherein the first NLU results data includes a first NLU hypothesis corresponding to the first user machine-generated input, the first NLU hypothesis including the intent and a second entity name, and the method further comprises:
sending, to a NLU task component, a second command to perform NLU processing with respect to the first text data;
receiving, from the NLU task component, second NLU results data corresponding to the first text data, the second NLU results data including a second NLU hypothesis corresponding to the first machine-generated input, the second NLU hypothesis including the intent and the first entity name;
determining, using the task request and the first NLU results data, that the second entity name included in the first NLU hypothesis is different than the first entity name included in the first machine-generated input;
determining, using the task request and the second NLU results data, that the second NLU hypothesis corresponds to the first machine-generated input based on the second NLU hypothesis including the first entity name;
based on the second entity name being different than the first entity name and the second NLU hypothesis corresponding to the first machine-generated input, determining that processing of the first machine-generated input by the NLU task component resulted in an error; and
sending, to the device, second data representing processing of the first machine-generated input results in identification of an improper NLU hypothesis.

3. The computer-implemented method of claim 1, wherein the ASR results data includes a first ASR hypothesis corresponding to the first machine-generated input, the first ASR hypothesis including a second entity name, and the method further comprises:
determining, using the first text data and the ASR results data, that the second entity name included in the first ASR hypothesis is different than the first entity name included in the first machine-generated input; and
sending, to the device, second data representing processing of the first machine-generated input results in identification of an improper ASR hypothesis.

4. A computer-implemented method comprising:
receiving, from a device, task request data including an intent and entity data, the entity data including a first entity name, a first entity type corresponding to the first entity name, a first entity identifier corresponding to the first entity name, and a second entity name;
determining, using the entity data, first data representing a first machine-generated input corresponding to the first entity name and the first entity type;
determining, using an entity resolution (ER) task component, first ER results data corresponding to the first data, the first ER results data including a second entity identifier corresponding to the first entity name;
determining, using the entity data and the first ER results data, that ER processing with respect to the first machine-generated input resulted in an error;
determining, using the intent and the entity data, second data representing a second machine-generated input, wherein the second machine-generated input corresponds to the intent and the second entity name;
determining, using the second data, audio data corresponding to synthesized speech representing the second machine-generated input;
determining, using an automatic speech recognition (ASR) task component, ASR results data corresponding to the second data, the ASR results data including a first ASR hypothesis corresponding to the second machine-generated input;
determining, using the second data and the ASR results data, that ASR processing with respect to the second machine-generated input resulted in an error;
sending, to the device, a first error indicator representing that ER processing with respect to the first machine-generated input resulted in an error; and
sending, to the device, a second error indicator representing that ASR processing with respect to the second machine-generated input resulted in an error.

5. The computer-implemented method of claim 4, wherein the second entity name corresponds to a third entity identifier, and the method further comprises:
determining, using the ER task component, second ER results data corresponding to the second data, the second ER results data including a fourth entity identifier corresponding to the second entity name;
determining, using the ER task component, third ER results data corresponding to the ASR results data, the third ER results data including a fifth entity identifier corresponding to the second entity name;
determining, using the second ER results data, that the fourth entity identifier corresponds to the third entity identifier;
determining, using the third ER results data, that the fifth entity identifier is different than the third entity identifier; and
based on the fourth entity identifier corresponding to the third entity identifier and the fifth entity identifier being different than the third entity identifier, determining that ASR processing with respect to the second machine-generated input resulted in an error.

6. The computer-implemented method of claim 4, further comprising:
receiving the task request data further including, a domain;
determining, using the intent and the entity data, third data representing a third machine-generated input, wherein the third machine-generated input corresponds to the second entity name, the domain and the intent;
determining, using a natural language understanding (NLU) task component, first NLU results data corresponding to the third data;
determining, using the task request data and the first NLU results data, that NLU processing with respect to the third machine-generated input resulted in an error; and
sending, to the device, a third error indicator representing that NLU processing with respect to the third machine-generated input resulted in an error.

7. The computer-implemented method of claim 6, wherein the second entity name corresponds to a third entity identifier, and the method further comprises:
determining, using the ER task component, second ER results corresponding to the third data, the second ER results data including a fourth entity identifier corresponding to the second entity name;
determining, using the ER task component, third ER results data corresponding to the first NLU results data, the third ER results data including a fifth entity identifier corresponding to the second entity name;
determining, the second ER results data, that the fourth entity identifier corresponds to the third entity identifier;
determining, the third ER results data, that the fifth entity identifier is different than the third entity identifier;

based on the fourth entity identifier corresponding to the third entity identifier and the fifth entity identifier being different than the third entity identifier, determining that NLU processing with respect to the third machine-generated input resulted in an error; and sending, to the device, a second the third error indicator representing that NLU processing with respect to the third machine-generated input resulted in an error.

8. The computer-implemented method of claim 6, further comprising:

receiving, from the ASR task component, second ASR results data corresponding to the third data;

determining, using the NLU task component, second NLU results data corresponding to the second ASR results data;

determining that the first NLU results data includes the intent;

determining that the second NLU results data includes a second intent different than the intent;

based on the first NLU results data corresponding to the intent and the second intent being different than the intent, determining that ASR processing with respect to the third machine-generated input resulted in an error; and sending, to the device, a fourth error indicator representing ASR processing with respect to the third machine-generated input resulted in an error.

9. The computer-implemented method of claim 4, further comprising:

receiving the task request data including a first entity source, and a domain;

receiving, from the ER task component, the first ER results data further including a second entity source used to determine the second entity identifier, wherein the second entity source is selected based on the domain and the intent;

determining that the first entity source is different than the second entity source; and sending, to the device, a third error indicator representing that entity source selection with respect to the first machine-generated input results in an error.

10. The computer-implemented method of claim 4, further comprising:

receiving, from the ER task component, the first ER results data including a ranked list of entity identifiers, wherein the ranked list includes the second entity identifier followed by a third entity identifier corresponding to the first entity name;

determining that the first entity identifier is different than the second entity identifier;

determining that the first entity identifier corresponds to the third entity identifier;

based on the first entity identifier corresponding to the third entity identifier and the third entity identifier following the second entity identifier in the ranked list, determining that ER ranking with respect to the first machine-generated input resulted in an error; and sending, to the device, a third indicator representing that ER ranking with respect to the first machine-generated input resulted in an error.

11. A system comprising:

at least one processor; and at least one memory including instructions that, when executed by the at least one processor, cause the system to:

receive, from a device, task request data including an intent and entity data, the entity data including a first entity name, a first entity type corresponding to the first entity name, a first entity identifier corresponding to the first entity name, and a second entity name;

determine, using the entity data, first data representing at least a first machine-generated input corresponding to the first entity name and the first entity type;

determine, using an entity resolution (ER) task component, first ER results data corresponding to the first data, the first ER results data including a second entity identifier corresponding to the first entity name;

determine, using the entity data and the first ER results data, that ER processing with respect to the first machine-generated input resulted in an error;

determine, using the intent and the entity data, second data representing a second machine-generated input, wherein the second machine-generated input corresponds to the intent and the second entity name;

determine, using the second data, audio data corresponding to synthesized speech representing the first machine-generated input;

determine, using an automatic speech recognition (ASR) task component, ASR results data corresponding to the second data, the ASR results data including a first ASR hypothesis corresponding to the second machine-generated input;

determine, using the second data and the ASR results data, that ASR processing with respect to the second machine-generated input resulted in an error;

send, to the device, a first error indicator representing that ER processing with respect to the first machine-generated input resulted in an error; and send, to the device, a second error indicator representing that ASR processing with respect to the second machine-generated input resulted in an error.

12. The system of claim 11, wherein the second entity name corresponds to a third entity identifier, and wherein the at least one memory includes further instructions that, when executed by the at least one processor, further cause the system to:

determine, using the ER task component, second ER results data corresponding to the second data, the second ER results data including a fourth entity identifier corresponding to the second entity name;

determine, using the ER task component, third ER results data corresponding to the ASR results data, the third ER results data including a fifth entity identifier corresponding to the second entity name;

determine, using the second ER results data, that the fourth entity identifier corresponds to the third entity identifier;

determine, using the third ER results data, that the fifth entity identifier is different than the third entity identifier; and based on the fourth entity identifier corresponding to the third entity identifier and the fifth entity identifier being different than the third entity identifier, determine that ASR processing with respect to the second machine-generated input resulted in an error.

13. The system of claim 11, wherein the at least one memory includes further instructions that, when executed by the at least one processor, further cause the system to:

receive the task request data further including a domain;

determine, using the intent and the entity data, third data representing a third machine-generated input, wherein the third machine-generated input corresponds to the second entity name, the domain and the intent;

determine, using a natural language understanding (NLU) task component first NLU results data corresponding to the third data;

determine, using the task request data and the first NLU results data, that NLU processing with respect to the third machine-generated input resulted in an error; and send, to the device, a second error indicator representing that NLU processing with respect to the third machine-generated input resulted in an error.

14. The system of claim 13, wherein the second entity name corresponds to a third entity identifier, and wherein the at least one memory includes further instructions that, when executed by the at least one processor, further cause the system to:

determine, using the ER task component, second ER results corresponding to the third data, the second ER results data including a fourth entity identifier corresponding to the second entity name;

determine, using the ER task component, third ER results data corresponding to the first NLU results data, the third ER results data including a fifth entity identifier corresponding to the second entity name;

determine, using the second ER results data, that the fourth entity identifier corresponds to the third entity identifier;

determine, using the third ER results data, that the fifth entity identifier is different than the third entity identifier;

based on the fourth entity identifier corresponding to the third entity identifier and the fifth entity identifier not being different than the third entity identifier, determine that NLU processing with respect to the third machine-generated input resulted in an error; and send, to the device, the third error indicator representing that NLU processing with respect to the third machine-generated input resulted in an error.

15. The system of claim 13, wherein the at least one memory includes further instructions that, when executed by the at least one processor, further cause the system to:

receive, from the ASR task component, second ASR results data corresponding to the third data;

determine, using the NLU task component, second NLU results data corresponding to the second ASR results data;

determine that the first NLU results data includes the intent;

determine that the second NLU results data includes a second intent different than the intent;

based on the first NLU results data corresponding to the intent and the second intent being different than the intent, determine that ASR processing with respect to the third machine-generated input resulted in an error; and send, to the device, a fourth error indicator representing ASR processing with respect to the third machine-generated input resulted in an error.

16. The system of claim 11, wherein the at least one memory includes further instructions that, when executed by the at least one processor, further cause the system to:

receive the task request data including a first entity source, and a domain;

receive, from the ER task component, the first ER results data further including a second entity source used to determine the second entity identifier, wherein the second entity source is selected based on the domain and the intent;

determine that the first entity source is different than the second entity source; and send, to the device, a third error indicator representing that entity source selection with respect to the first machine-generated input results in an error.

17. The system of claim 11, wherein the at least one memory includes further instructions that, when executed by the at least one processor, further cause the system to:

receive, from the ER task component, the first ER results data including a ranked list of entity identifiers, wherein the ranked list includes the second entity identifier followed by a third entity identifier corresponding to the first entity name;

determine that the first entity identifier is different than the second entity identifier;

determine that the first entity identifier corresponds to the third entity identifier;

based on the first entity identifier corresponding to the third entity identifier and the third entity identifier following the second entity identifier in the ranked list, determine that ER ranking with respect to the first machine-generated input resulted in an error; and send, to the device, a third indicator representing that ER ranking with respect to the first machine-generated input resulted in an error.

* * * * *